(12) United States Patent
Ito

(10) Patent No.: US 6,480,342 B1
(45) Date of Patent: Nov. 12, 2002

(54) ZOOM LENS SYSTEM

(75) Inventor: Kazumi Ito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/510,235

(22) Filed: Feb. 22, 2000

(30) Foreign Application Priority Data

Feb. 22, 1999 (JP) .......................................... 11-042694

(51) Int. Cl.$^7$ .............................................. G02B 15/14
(52) U.S. Cl. ...................................... 359/692; 359/683
(58) Field of Search ................................. 359/692, 690, 359/687, 688, 683, 676

(56) References Cited

U.S. PATENT DOCUMENTS

| | | | | |
|---|---|---|---|---|
| 4,494,828 A | * | 1/1985 | Matsumoto et al. | ........ 359/690 |
| 5,825,557 A | * | 10/1998 | Ohno | .......................... 359/692 |
| 5,864,435 A | * | 1/1999 | Toyama | ..................... 359/692 |

FOREIGN PATENT DOCUMENTS

| | | |
|---|---|---|
| JP | 64-52111 | 2/1989 |
| JP | 8-110468 | 4/1996 |
| JP | 8-304701 | 11/1996 |
| JP | 9-127415 | 5/1997 |
| JP | 9-152549 | 6/1997 |
| JP | 10-148756 | 6/1998 |

\* cited by examiner

Primary Examiner—Jordan M. Schwartz
(74) Attorney, Agent, or Firm—Pillsbury Winthrop LLP

(57) ABSTRACT

A zoom lens system which comprises a first lens unit having positive refractive power and a second lens unit having negative refractive power, and is configured to change a magnification by varying an airspace between the first lens unit and the second lens unit, wherein the first lens unit comprises, in order from the object side, at least a first subunit having negative refractive power and a second subunit which comprises a lens component or a cemented lens component consisting of two or more lens elements and has positive refractive power, wherein the second lens unit comprises a first negative lens component, a second positive lens component and a third negative lens component which are disposed in order from the object side with airspaces interposed, and wherein the zoom lens system satisfies a condition (1) mentioned below, has a high vari-focal ratio and an unlimited back focal length and is suited for use with a 35 mm compact camera, $$1 < f_{G1}/f_{Li} < 0.3. \qquad (1)$$

28 Claims, 14 Drawing Sheets

ZOOM LENS SYSTEM

BACKGROUND OF THE INVENTION

1. Field of the Invention

The present invention relates to a zoom lens system having a high vari-focal ratio, and more specifically a zoom lens system which has an unlimited back focal length and is suited for use as a photographic lens system for compact cameras (35 mm compact cameras in particular).

2. Description of the Prior Art

As zoom lens systems which have a simplest composition, there are conventionally known zoom lens system each consisting of two lens units.

The zoom lens systems each consisting of the two lens unit provide merits such as a merit to permit simplifying a structure of a lens barrel, but have a defect to allow aberrations to be varied remarkably, thereby making it impossible to enhance vari-focal ratios.

As a conventional example of the zoom lens systems each consisting of two lens units, there is known a zoom lens system disclosed by Japanese Patent Kokai Publication No. He 9-152549 which uses a second lens unit consisting of two positive and negative lens components and has a vari-focal ratio close to 3. In order to obtain a zoom lens system which is more compact than the conventional zoom lens system or has a vari-focal ratio higher than that of the conventional zoom lens system, however, it is necessary to strengthen refractive power of a second lens unit, whereby aberrations are produced in larger amounts and varied more remarkably by changing a magnification.

Furthermore, each of zoom lens systems disclosed by Japanese Patents Kokai Publication No. Sho 64-52111 and No. Hei 8-110468 which are other conventional examples uses a second lens unit which consists of three lens components to share negative refractive power among the lens components and lower curvature on lens surfaces, thereby reducing amounts of aberrations to be produced and variations of the aberrations to be caused by changing a magnification.

When the refractive power of the second lens unit is strengthened, refractive power of each lens component is strengthened correspondingly, whereby a variation of an airspace in the lens unit produces a large influence on a change of a focal length.

When a second lens unit is composed of a negative lens component, a positive lens component and a negative lens component as in a zoom lens system disclosed by Japanese Patent Kokai Publication No. Hei 8-304701, Hei 9-127415 or Hei 10-148756, it is possible to cancel an influence due to the positive lens component with those due to the negative lens components, thereby preventing a change of a location of a focal point.

SUMMARY OF THE INVENTION

A primary object of the present invention is to provide a zoom lens system which comprises, in order from the object side, a first lens unit having positive refractive power and a second lens unit having negative refractive power, and is configured to change a magnification by varying an airspace between the first lens unit and the second lens unit, wherein the first lens unit comprises, in order from the object side, at least a first subunit which has negative refractive power and a second subunit which is composed of a lens component or a cemented lens component consisting of two or more lens elements and has positive refractive power, wherein the second lens unit comprises a first negative lens component, a second positive lens component and a third negative lens component which are disposed in order from the object side with airspaces interposed, and wherein all lens components disposed in the first subunit having the negative refractive power of the first lens unit satisfy the following condition (1):

$$-1 < f_{G1}/f_{Li} < 0.3 \tag{1}$$

Another object of the present invention is to provide a zoom lens system which comprises, in-order from the object side, a first lens unit having positive refractive power and a second lens unit having negative refractive power, and is configured to change a magnification at a ratio of 2 or higher by varying an airspace between the first lens unit having the positive refractive power and the second lens unit having the negative refractive power, wherein the second lens unit having the negative refractive power comprises a negative lens component, a positive lens component and a negative lens component which are arranged in order from the object side with airspaces interposed and formed by molding a resin material, and satisfies the following condition (3):

$$-0.03(1/mm) < MGL/|f_{21}| < 0.03(1/mm) \tag{3}$$

Still another object of the present invention is to provide a zoom lens system which comprises, in order from the object side, a first lens unit having positive refractive power and a second lens unit having negative refractive power, and is configured to change a magnification by varying an airspace between the first lens unit having the positive refractive power and the second lens unit having the negative refractive power, characterized in that the second lens unit having the negative refractive power comprises a first negative lens component, a second positive lens component and a third negative lens component which are disposed in order from the object side with airspaces interposed, and that the positive lens component has an Abbe's number of 40 or larger.

DETAILED DESCRIPTION OF THE PREFERRED EMBODIMENTS

Figure 1:
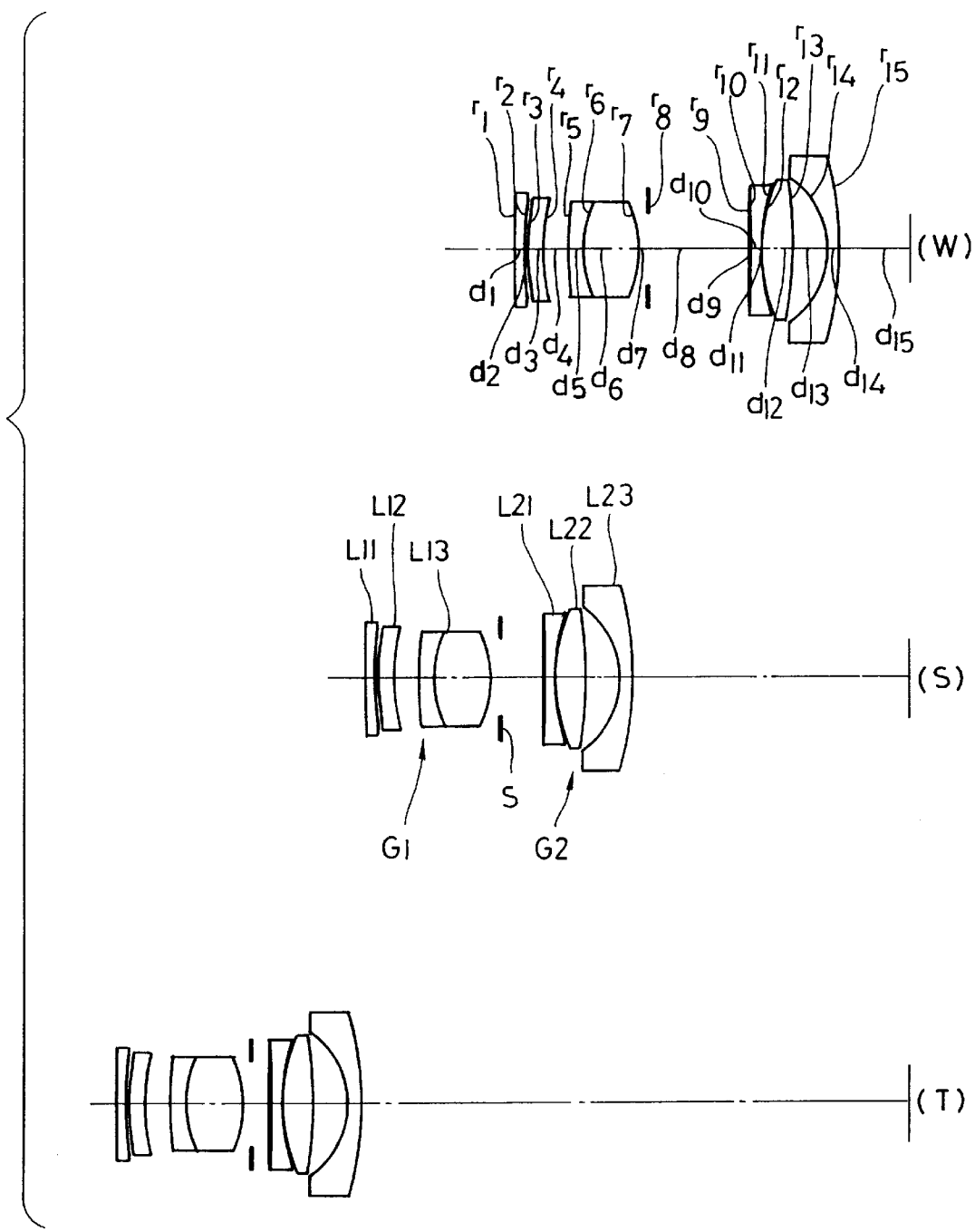
FIGS. 1 through 12 are sectional views illustrating compositions of first through twelfth embodiments of the zoom lens system according to the present invention.

The zoom lens system having a high vari-focal ratio according to the present invention is a zoom lens system which comprises, in order from the object side, a first lens unit having positive refractive power and a second lens unit having negative refractive power, and is configured to change a focal length of the lens system as a whole by varying an airspace between the first lens unit and the second lens unit, characterized in that the first lens unit comprises, in order from the object side, at least a first subunit which has negative refractive power and a second positive subunit which is composed of a lens component or a cemented lens component consisting of two or more lens elements, that the second lens unit comprises a first negative lens component, a second positive lens component and a third negative lens component which are disposed in order from the object side with airspaces interposed, and that the first subunit having the negative refractive power of the first lens unit satisfies the following condition (1):

$$-1 < f_{G1}/f_{Li} < 0.3 \tag{1}$$

wherein a reference symbol $f_{G1}$ represents a total focal length of the first lens unit and a reference symbol $f_{Li}$ designates a focal length of each lens component disposed in the first subunit and a reference symbol i denotes an ordinal number of the lens component as counted from the object side.

Speaking concretely, reference symbols $f_{L1}$, $f_{L2}$, . . . represent focal lengths of first, second, . . . lens components as counted from the object side.

The zoom lens system according to the present invention comprises the first lens unit and the second lens unit, and the second lens unit is composed of the three lens elements so that curvature, for example, is lowered by sharing refractive power of a negative lens component between the two lens elements, thereby reducing amounts of aberrations to be produced and variations of the aberrations to be caused by changing a magnification. In this case, the lens components are arranged in an order of the first negative lens component, the second positive lens component and the third negative lens component in the second lens unit so that influences on a variation of a focal length due to airspaces in the lens unit will be suppressed to a low level.

Since the zoom lens system according to the present invention uses the second lens unit in which the negative lens component is disposed on the object side, the zoom lens system produces a tendency to locate a principal point on the image side of a principal point of a zoom lens system which uses a second lens unit composed of two positive and negative lens components and provides a wider optical space even when a distance between the first lens unit and the second lens unit is equal to that in the zoom lens system which uses the second lens unit composed of the two lens components. Accordingly, the zoom lens system according to the present invention can be configured as a telephoto type lens system without narrowing an airspace between the lens units when the first lens unit is configured as an inverted telephoto type in which a negative lens component is disposed on the object side and concentrating positive refractive power on a lens component disposed on the image side to slit a principal point rearward.

In order to shift the principal point of the first lens unit rearward, the first lens unit is composed of a second lens component which comprises a lens component having positive refractive power or a cemented lens component having positive refractive power and a first negative lens component which is disposed on the object side of the second lens component, and configured to satisfy the condition (1) mentioned above.

If an upper limit of 0.3 of the condition (1) is exceeded, a lens component which has strong positive power will be disposed on the object side in the positive subunit of the first lens unit to share positive power, thereby shifting the principal point forward and producing a demerit to configure the zoom lens system as the telephoto type. If a lower limit of −1 of the condition (1) is exceeded, in contrast, negative power will be strengthened in the first lens unit and the positive power of the second lens component must be strengthened to maintain the positive power of the first lens unit as a whole, thereby undesirably enlarging amounts of aberrations to be produced.

Furthermore, it is desirable to configure the first subunit of the first lens unit so as to comprise one or more negative lens components or lens components which have weak refractive power.

Furthermore, it is desirable that the zoom lens system according to the present invention described above satisfies, in place of the condition (1), the following condition (1-1):

$$-0.8 < f_{G1}/f_{Li} < 0.2 \tag{1-1}$$

It is more preferable to satisfy, in place of the condition (1) or the condition (1-1), the following condition (1-2):

$$-0.5 < f_{G1}/f_{Li} < 0.1 \tag{1-2}$$

Furthermore, it is desirable to dispose at least an aspherical surface in the second lens unit.

For correction of spherical aberration, coma and the like, it is generally effective to use an aspherical surface as a surface which is located close to a stop. Furthermore, as an aspherical surface is disposed at a location farther from a stop, the surface exhibits a higher effect for correction of astigmatism, distortion and the like.

Though the aspherical surface disposed in the second lens unit corrects astigmatism and distortion at a wide position or shperical aberration and coma at a tele position, effects to correct spherical aberration and coma at the tele position will be insufficient when the aspherical surface is used on the third negative lens component which is disposed on the image side. It is therefore desirable to use the aspherical surface on the first negative lens component which is disposed on the object side or the second positive lens component in the second lens unit.

As means to form an aspherical surface on a glass lens component for manufacturing such an aspherical lens component, there are known means to mold a glass lens component into an aspherical lens component, means to form an aspherical resin layer on a lens surface and so on.

It is desirable to form an aspherical surface as an image side surface of the first negative lens component though an aspherical resin surface can be formed on either surface of the first negative lens component. This is because the resin layer can be injured more easily than a glass material and the image side surface which is located inside after assembling the lens component into the lens unit cannot be injured, thereby facilitating to handle the lens unit. Furthermore, it is necessary for forming the resin layer to form a resin reservoir at a marginal portion. When the resin layer is to be formed on an object side surface, it is necessary to take mechanical interference with a stop into consideration. When the aspherical surface is to be formed on the image side surface of the first negative lens component, however, it is unnecessary to take the mechanical interference into consideration and an airspace between the second lens unit and the stop can be narrowed, thereby obtaining an advantage to configure the zoom lens system so as to have a higher vari-focal ratio.

Unlike a resin surface, an aspherical surface formed by molding a glass material is free from a fear of injury and permits composing an optical system which is stable regardless of variations of temperature and humidity.

When the aspherical surface is disposed on the first negative lens component disposed in the second lens unit, it is preferable for correction of spherical aberration, spherical aberration on, a side of the tele position in particular, to reserve an airspace D between the first negative lens component and the second positive lens component so as to satisfy the following condition (2):

$$D/|f_{G2}|>0.03 \quad (2)$$

wherein a reference symbol $f_{G2}$ represents a total focal length of the second lens unit.

Furthermore, the zoom lens system according to the present invention may have a composition which is described below:

That is, the zoom lens system according to the present invention may be a zoom lens system which comprises a first lens unit having positive refractive power and a second lens unit having negative refractive power, and is configured to change a magnification by varying an airspace between the first lens unit and the second lens unit, wherein the second lens unit comprises a first negative lens component, a second positive lens component and a third negative lens component which are disposed in order from the object side with airspaces interposed, wherein the zoom lens system has a vari-focal ratio of 2 or higher and comprises at least an aspherical surface on the first negative lens component and wherein the second lens unit satisfies the condition (2) mentioned above.

If the airspace between the first negative lens component and the second positive lens component is narrowed until a lower limit of the condition (2) is exceeded, spherical aberration will be aggravated at the tele position, thereby degrading imaging performance.

Furthermore, it is preferable to specify the lower limit as 0.04, or satisfy the following condition (2-1):

$$D/|f_{G2}|>0.04 \quad (2-1)$$

An aspherical surface may be disposed a lens component other than the first negative lens component. It is effective for correction of aberrations to configure both surfaces of the second lens component L22 of the second lens unit as aspherical surfaces or add an aspherical surface to the third lens component L23 of the second lens unit. An aspherical surface which is disposed on a front surface of the first lens component L21 or the second lens component L22 of the second lens unit is effective for correction of spherical aberration, whereas aberrations such as astigmatism and distortion can be corrected more effectively by adding aspherical surfaces to a rear surface of the second lens component L22 and the third lens component L23 on which off axial rays are relatively high. In this case, it is effective to correct aberrations by combining these aspherical surfaces with the aspherical surface on the first lens component L21 or the front surface of the second lens component L22.

When importance is attached to a light weight and a low manufacturing cost of the lens. system, it is effective to use manufacture aspherical lens components by molding a resin material. However, lens components which are manufactured by molding the resin material have shapes and characteristics to be varied due to variations of environments such as temperature and humidity, thereby allowing variations of focal lengths and aberrations.

When a resin molded aspherical lens component is to be used in the first lens unit of the lens system according to the present invention, it is desirable to configure the lens component as a powerless lens component to prevent its focal length from being changed due to the variations of environments. When a resin molded aspherical lens component is to be used in the second lens unit, the lens component may have power since its focal length is scarcely influenced due to the variations of environments.

When the first negative lens component has power which is stronger than that of the second positive lens component in the second lens unit of the zoom lens system according to the present invention, the principal point is located at a position shifted toward the object side, thereby making it difficult to reserve a required back focal length at the wide position and enlarging an effective diameter of the second positive lens component. Accordingly, it is desirable that the first negative lens component has power which is weaker than that of the second positive lens component and the first negative lens component is suited for configuration as an aspherical resin lens component.

In case of a zoom lens system having a high vari-focal ratio exceeding 2 such as the zoom lens system according to the present invention, it is desirable that components have strong power to configure the zoom lens system so as to be compact and have a high vari-focal ratio.

When a molded resin lens component is used in a lens system, rays emerging from this molded resin lens component are transmitted to an image surface by a lens system disposed on the image side of the molded resin lens component. Accordingly, variations of the rays caused due to variations of environments around the molded resin lens component are highly magnified by the lens system disposed on the image side of the molded resin lens component.

In order to enhance a stability of the zoom lens system having the high vari-focal ratio mentioned above, it is therefore necessary to reduce variations of a molded resin lens component due to the variations of environments by weakening power of the molded resin lens component or lower a magnification of the optical system disposed on the image side of the molded resin lens component. For a reason described above, it is desirable that the zoom lens system according to the present invention satisfies the following condition (3):

$$-0.03(1/mm)<MGL/|f_{21}|<0.03(1/mm) \quad (3)$$

wherein a reference symbol MGL represents a maximum value of a lateral magnification of an optical system which is disposed on the image side of an object side lens component of the second lens unit having the negative refractive power and does not comprise the object side lens component, and a reference symbol $f_{21}$ designates a focal length of the object side negative lens component of the second lens unit having the negative refractive power.

Furthermore, the zoom lens system according to the present invention may have a composition described below. Speaking concretely, the zoom lens system according to the present invention may be a zoom lens system which comprises, in order from the object side, a first lens unit having positive refractive power and a second lens unit having negative refractive power, and is configured to change a magnification by varying an airspace between the first lens unit having the positive refractive power and the second lens unit having the negative refractive power, wherein the second lens unit having the negative refractive power comprises, in order from the object side, a first negative lens component, a second positive lens component and a third negative lens component which are disposed in order from the object side with airspaces interposed and formed by molding a resin material, and satisfies the condition (3) mentioned above.

If the negative molded resin lens component mentioned above has strong power or the second lens unit comprises a molded resin lens component and the lens system disposed on the image side of this lens component has a high lateral magnification exceeding an upper limit or a lower limit of the condition (3), the image surface will be shifted and astigmatism and coma will be aggravated at a high or low temperature and at a high or low humidity due to a variation of the molded resin lens component, thereby remarkably lowering performance.

In the zoom lens system according to the present invention which has the composition described above, a variation of chromatic aberration is caused due to changes in heights of rays passing through the second lens unit which are caused by changing a magnification. Though it is considered to prevent this variation by balancing variations of aberrations in the second lens unit with those in the first lens unit, it is not easy to balance the variations of aberrations in the second lens unit with those in the first lens unit since the change of the magnification causes variations of aberrations in the first lens unit which are smaller than those in the second lens unit. It is therefore necessary to reduce the variations of aberrations themselves in the second lens unit.

By enlarging an Abbe's number of a positive lens component and enlarging an Abbe's number of a negative lens component correspondingly, a variation amount of chromatic aberration can be reduced while maintaining balance among aberrations in a lens system.

It is therefore desirable for the zoom lens system according to the present invention that the positive lens component of the second lens unit has an Abbe's number of 40 or larger. By selecting as Abbe's number of 40 or larger for the positive lens component, it is possible to configure the second lens unit so as to produce chromatic aberration in a smaller amount, thereby allowing chromatic aberration to be varied lens by changing a magnification. When an Abe's number has a value smaller than 40, it is difficult to correct chromatic aberration in the second lens unit and chromatic aberration is varied remarkably by changing the magnification, thereby degrading performance.

Furthermore, the zoom lens system according to the present invention may be a zoom lens system which has composition described below:

Speaking concretely, the zoom lens system according to the present invention may be a zoom lens system which comprises, in order from the object side, a first lens unit having positive refractive power and a second lens unit having negative refractive power, and is configured to change a magnification by varying an airspace between the first lens unit having the positive refractive power and the second lens unit having the negative refractive power, characterized in that the second lens unit having the negative refractive power comprises a first negative lens component, a second positive lens component and a third negative lens component which are disposed in order from the object side with airspaces interposed, and that the second positive lens component has an Abe's number of 40 or larger.

When a stop is disposed between the first lens unit and the second lens unit, and chromatic aberration is corrected by balancing the first lens unit before the stop with the second lens unit after, the stop, it is desirable that a difference between an Abbe's number $v_{1P}$ of positive lens component disposed on the image side in the first lens unit and an Abbe's number $v_{2P}$ of the positive lens component in the second lens unit satisfies the following condition (4):

$$5 < v_{1P} - v_{2P} < 25 \tag{4}$$

If the difference between the Abbe's numbers of the positive lens component in the first lens unit and the positive lens component in the second lens unit is not smaller than an upper limit of 25 of the condition (4), chromatic aberration, longitudinal chromatic aberration in particular, will be remarkable, thereby degrading performance. If the difference is not larger than a lower limit of 5 of the condition (4), in contrast, chromatic aberration, longitudinal chromatic aberration in particular, will be undercorrected.

It is more desirable to satisfy, in place of the condition (4), the following condition (4-1):

$$10 < v_{1P} - v_{2P} < 23 \tag{4-1}$$

Furthermore, it is much more desirable to satisfy, in place of the condition (4) or the condition (4-1), the following condition (4-2):

$$13 < v_{1P} - v_{2P} < 20 \tag{4-2}$$

The preferred embodiments of the present invention will be described below in a form of numerical data:

Embodiment 1
f = 39.300~70.030~111.000, F/4.76~7.60~10.90

| | | | | | | | |
|---|---|---|---|---|---|---|---|
| $r_1 =$ | 700.000 | $d_1 =$ | 1.26 | $n_1 =$ | 1.70000 | $v_1 =$ | 48.08 |
| $r_2 =$ | 53.401 | $d_2 =$ | 0.50 | | | | |
| $r_3 =$ | 27.738 (aspherical surface) | $d_3 =$ | 2.00 | $n_2 =$ | 1.52542 | $v_2 =$ | 55.78 |
| $r_4 =$ | 25.693 | $d_4 =$ | 3.20 | | | | |
| $r_5 =$ | 54.469 | $d_5 =$ | 2.10 | $n_3 =$ | 1.62004 | $v_3 =$ | 36.26 |
| $r_6 =$ | 14.395 | $d_6 =$ | 7.41 | $n_4 =$ | 1.56384 | $v_4 =$ | 60.70 |
| $r_7 =$ | −14.395 | $d_7 =$ | 1.00 | | | | |
| $r_8 =$ | ∞ (stop) | $d_8 =$ | $D_1$ (variable) | | | | |
| $r_9 =$ | −163.797 (aspherical surface) | $d_9 =$ | 0.24 | $n_5 =$ | 1.52540 | $v_5 =$ | 51.81 |
| $r_{10} =$ | −497.273 | $d_{10} =$ | 1.49 | $n_6 =$ | 1.60738 | $v_6 =$ | 56.81 |
| $r_{11} =$ | 28.374 | $d_{11} =$ | 0.25 | | | | |
| $r_{12} =$ | 26.214 | $d_{12} =$ | 3.73 | $n_7 =$ | 1.54814 | $v_7 =$ | 45.79 |
| $r_{13} =$ | −54.731 | $d_{13} =$ | 4.63 | | | | |
| $r_{14} =$ | −10.854 | $d_{14} =$ | 1.53 | $n_8 =$ | 1.69680 | $v_8 =$ | 55.53 |
| $r_{15} =$ | −46.324 | $d_{15} =$ | $D_2$ (variable) | | | | |

-continued aspherical surface coefficients (3rd surface)   $K = 2.016$,   $A_4 = -1.09991 \times 10^{-4}$,   $A_6 = -8.68354 \times 10^{-7}$
                              $A_8 = 6.25320 \times 10^{-9}$,    $A_{10} = -2.59077 \times 10^{-10}$
                              $A_{12} = 2.64658 \times 100^{-12}$ (9th surface)   $K = 309.034$, $A_4 = 6.57670 \times 10^{-5}$,   $A_6 = 1.96727 \times 10^{-7}$
                              $A_8 = 1.15175 \times 10^{-8}$,   $A_{10} = -1.69765 \times 10^{-10}$
                              $A_{12} = 1.10705 \times 10^{-12}$

| | | | |
|---|---|---|---|
| f | 39.300 | 70.300 | 111.000 |
| $D_1$ | 13.16 | 5.70 | 2.18 |
| $D_2$ | 9.21 | 36.08 | 71.90 |

$f_W = 39.3$, $f_T = 111.0$, $f_T/f_W = 2.924$, $f_{G1} = 27.6456$
$f_{L1} = -82.6535$, $f_{L2} = -1.00 \times 10^3$, $f_{G1}/f_{L1} = -0.334476$
$f_{G1}/f_{L2} = -2.76 \times 10^{-2}$, $\nu_{2P} = 45.79$, $\nu_{1P} - \nu_{2P} = 14.91$

Embodiment 2
$f = 39.299 \sim 69.972 \sim 110.993$, $F/4.76 \sim 7.60 \sim 10.90$

| | | | | | | | |
|---|---|---|---|---|---|---|---|
| $r_1 =$ | 700.000 | $d_1 =$ | 1.26 | $n_1 =$ | 1.70000 | $\nu_1 =$ | 48.08 |
| $r_2 =$ | 46.971 | $d_2 =$ | 0.50 | | | | |
| $r_3 =$ | 27.843 (aspherical surface) | $d_3 =$ | 2.00 | $n_2 =$ | 1.52542 | $\nu_2 =$ | 55.78 |
| $r_4 =$ | 29.081 | $d_4 =$ | 3.18 | | | | |
| $r_5 =$ | 55.992 | $d_5 =$ | 2.02 | $n_3 =$ | 1.62004 | $\nu_3 =$ | 36.26 |
| $r_6 =$ | 14.459 | $d_6 =$ | 7.37 | $n_4 =$ | 1.56384 | $\nu_4 =$ | 60.70 |
| $r_7 =$ | −14.459 | $d_7 =$ | 1.00 | | | | |
| $r_8 =$ | ∞ (stop) | $d_8 =$ | $D_1$ (variable) | | | | |
| $r_9 =$ | −161.432 (aspherical surface) | $d_9 =$ | 0.24 | $n_5 =$ | 1.52540 | $\nu_5 =$ | 51.81 |
| $r_{10} =$ | −497.273 | $d_{10} =$ | 1.39 | $n_6 =$ | 1.60738 | $\nu_6 =$ | 56.81 |
| $r_{11} =$ | 27.997 | $d_{11} =$ | 0.25 | | | | |
| $r_{12} =$ | 25.914 | $d_{12} =$ | 3.77 | $n_7 =$ | 1.54814 | $\nu_7 =$ | 45.79 |
| $r_{13} =$ | −53.395 | $d_{13} =$ | 4.64 | | | | |
| $r_{14} =$ | −10.842 | $d_{14} =$ | 1.53 | $n_8 =$ | 1.69680 | $\nu_8 =$ | 55.53 |
| $r_{15} =$ | −46.155 | $d_{15} =$ | $D_2$ (variable) | | | | | aspherical surface coefficients (3rd surface)   $K = 2.015$,   $A_4 = -1.11124 \times 10^{-4}$,   $A_6 = -8.20145 \times 10^{-7}$
                              $A_8 = 4.07899 \times 10^{-9}$,    $A_{10} = -2.21819 \times 10^{10}$
                              $A_{12} = 2.41621 \times 10^{-12}$ (9th surface)   $K = 309.033$, $A_4 = 6.65118 \times 10^5$,     $A_6 = 1.75447 \times 10^{-7}$
                              $A_8 = 1.25145 \times 10^{-8}$,   $A_{10} = -1.87071 \times 10^{-10}$
                              $A_{12} = 1.25257 \times 10^{-12}$

| | | | |
|---|---|---|---|
| f | 39.299 | 69.972 | 111.993 |
| $D_1$ | 13.14 | 5.66 | 2.11 |
| $D_2$ | 9.27 | 36.21 | 72.23 |

$f_W = 39.3$, $f_T = 111.0$, $f_T/f_W = 2.824$, $f_{G1} = 27.64378$
$f_{L1} = -71.9849$, $f_{L2} = 800$, $f_{G1}/f_{L1} = -0.384002$
$f_{G1}/f_{L2} = 3.46 \times 10^{-2}$, $\nu_{2P} = 45.79$, $\nu_{1P} - \nu_{2P} = 14.91$

Embodiment 3
$f = 39.262 \sim 66.685 \sim 110.687$, $F/4.76 \sim 7.60 \sim 10.90$

| | | | | | | | |
|---|---|---|---|---|---|---|---|
| $r_1 =$ | 743.179 | $d_1 =$ | 1.34 | $n_1 =$ | 1.74320 | $\nu_1 =$ | 49.34 |
| $r_2 =$ | 55.009 | $d_2 =$ | 0.50 | | | | |
| $r_3 =$ | 31.611 (aspherical surface) | $d_3 =$ | 2.00 | $n_2 =$ | 1.52542 | $\nu_2 =$ | 55.78 |
| $r_4 =$ | 30.922 | $d_4 =$ | 3.23 | | | | |
| $r_5 =$ | 55.619 | $d_5 =$ | 2.12 | $n_3 =$ | 1.62004 | $\nu_3 =$ | 36.26 |
| $r_6 =$ | 14.705 | $d_6 =$ | 7.43 | $n_4 =$ | 1.56384 | $\nu_4 =$ | 60.70 |
| $r_7 =$ | −14.705 | $d_7 =$ | 1.00 | | | | |
| $r_8 =$ | ∞ (stop) | $d_8 =$ | $D_1$ (variable) | | | | |
| $r_9 =$ | −163.400 | $d_9 =$ | 1.30 | $n_5 =$ | 1.58313 | $\nu_5 =$ | 59.38 |
| $r_{10} =$ | 77.784 | $d_{10} =$ | 0.30 | $n_6 =$ | 1.52540 | $\nu_6 =$ | 51.81 |
| $r_{11} =$ | 59.936 (aspherical surface) | $d_{11} =$ | 1.33 | | | | |
| $r_{12} =$ | 49.749 | $d_{12} =$ | 4.00 | $n_7 =$ | 1.58144 | $\nu_7 =$ | 40.75 |
| $r_{13} =$ | −64.921 | $d_{13} =$ | 4.45 | | | | |
| $r_{14} =$ | −10.794 | $d_{14} =$ | 1.55 | $n_8 =$ | 1.71300 | $\nu_8 =$ | 53.87 |
| $r_{15} =$ | −45.518 | $d_{15} =$ | $D_2$ (variable) | | | | | aspherical surface coefficients (3rd surface)   $K = 2.016$,   $A_4 = -1.02484 \times 10^{-4}$,   $A_6 = -6.94140 \times 10^{-7}$
                              $A_8 = 1.98592 \times 10^{-9}$,    $A_{10} = -1.51044 \times 10^{-10}$
                              $A_{12} = 1.75963 \times 10^{-12}$ -continued

| | | | | | | | |
|---|---|---|---|---|---|---|---|
| (9th surface) | K = | −12.626, | $A_4$ = | −5.24756 × 10⁻⁵, | $A_6$ = | −5.68158 × −7 | |
| | | | $A_8$ = | 5.96370 × 10⁻⁹, | $A_{10}$ = | −1.37564 × 10⁻¹⁰ | |
| | | | $A_{12}$ = | 6.36714 × 10⁻¹³ | | | |
| f | | 39.262 | | 66.685 | | 110.687 | |
| $D_1$ | | 12.77 | | 5.63 | | 1.56 | |
| $D_2$ | | 8.87 | | 32.78 | | 71.16 | |

$f_W = 39.3$, $f_T = 110.7$, $f_T/f_W = 2.819$, $f_{G1} = 27.95912$
$f_{L1} = -80$, $f_{L2} = 3.71 \times 10^8$, $f_{G1}/f_{L1} = -0.349489$
$f_{G1}/f_{L2} = 7.53 \times 10^{-8}$, $D/|f_{G2}| = 0.055$, $\nu_{2P} = 45.75$
$\nu_{1P} - \nu_{2P} = 19.95$

Embodiment 4
f = 39.299~69.988~110.970, F/4.76~7.60~10.90

| | | | | | | | |
|---|---|---|---|---|---|---|---|
| $r_1$ = | 700.000 | $d_1$ = | 1.35 | $n_1$ = | 1.65844 | $\nu_1$ = | 50.88 |
| $r_2$ = | 43.387 | $d_2$ = | 0.10 | $n_2$ = | 1.52540 | $\nu_2$ = | 51.81 |
| $r_3$ = | 60.867 (aspherical surface) | $d_3$ = | 3.97 | | | | |
| $r_4$ = | 58.251 | $d_4$ = | 1.70 | $n_3$ = | 1.67270 | $\nu_3$ = | 32.10 |
| $r_5$ = | 18.388 | $d_5$ = | 8.44 | $n_4$ = | 1.56384 | $\nu_4$ = | 60.70 |
| $r_6$ = | −14.685 | $d_6$ = | 1.00 | | | | |
| $r_7$ = | ∞ (stop) | $d_7$ = | $D_1$ (variable) | | | | |
| $r_8$ = | −98.760 | $d_8$ = | 1.30 | $n_5$ = | 1.58313 | $\nu_5$ = | 59.38 |
| $r_9$ = | 54.300 | $d_9$ = | 0.30 | $n_6$ = | 1.52540 | $\nu_6$ = | 51.81 |
| $r_{10}$ = | 41.842 (aspherical surface) | $d_{10}$ = | 1.25 | | | | |
| $r_{11}$ = | 34.229 | $d_{11}$ = | 3.71 | $n_7$ = | 1.54814 | $\nu_7$ = | 45.79 |
| $r_{12}$ = | −43.523 | $d_{12}$ = | 4.39 | | | | |
| $r_{13}$ = | −10.660 | $d_{13}$ = | 1.55 | $n_8$ = | 1.71300 | $\nu_8$ = | 53.87 |
| $r_{14}$ = | −46.608 | $d_{14}$ = | $D_2$ (variable) | | | | | aspherical surface coefficients

| | | | | | | | |
|---|---|---|---|---|---|---|---|
| (3rd surface) | K = | 15.062, | $A_4$ = | 9.25997 × 10⁻⁵, | $A_6$ = | 4.55195 × 10⁻⁷ | |
| | | | $A_8$ = | 1.20971 × 10⁻⁸, | $A_{10}$ = | −2.91944 × 10⁻¹⁰ | |
| | | | $A_{12}$ = | 4.48131 × 10⁻¹² | | | |
| (10th surface) | K = | −12.626, | $A_4$ = | −4.73590 × 10⁻⁵, | $A_6$ = | −2.14851 × 10⁻⁷ | |
| | | | $A_8$ = | −1.10687 × 10⁻⁸, | $A_{10}$ = | 1.68400 × 10⁻¹⁰ | |
| | | | $A_{12}$ = | −1.57352 × 10⁻¹² | | | |
| f | | 39.299 | | 69.988 | | 110.970 | |
| $D_1$ | | 12.78 | | 5.16 | | 1.55 | |
| $D_2$ | | 9.20 | | 36.52 | | 73.01 | |

$f_W = 39.3$, $f_T = 111.0$, $f_T/f_W = 2.824$, $f_{G1} = 27.70608$
$f_{L1} = -93.0241$, $f_{G1}/f_{L1} = -0.297838$, $D/|f_{G2}| = 0.051$
$\nu_{2P} = 45.79$, $\nu_{1P} - \nu_{2P} = 14.91$

Embodiment 5
f = 39.330~70.103~111.100, F/4.86~7.88~11.30

| | | | | | | | |
|---|---|---|---|---|---|---|---|
| $r_1$ = | ∞ | $d_1$ = | 1.35 | $n_1$ = | 1.80610 | $\nu_1$ = | 40.92 |
| $r_2$ = | 50.000 | $d_2$ = | 0.15 | $n_2$ = | 1.52540 | $\nu_2$ = | 51.81 |
| $r_3$ = | 75.448 (aspherical surface) | $d_3$ = | 5.96 | | | | |
| $r_4$ = | 77.034 | $d_4$ = | 1.60 | $n_3$ = | 1.67270 | $\nu_3$ = | 32.10 |
| $r_5$ = | 25.481 | $d_5$ = | 4.26 | $n_4$ = | 1.56384 | $\nu_4$ = | 60.70 |
| $r_6$ = | −14.234 | $d_6$ = | 1.00 | | | | |
| $r_7$ = | ∞ (stop) | $d_7$ = | $D_1$ (variable) | | | | |
| $r_8$ = | −81.768 (aspherical surface) | $d_8$ = | 2.10 | $n_5$ = | 1.52542 | $\nu_5$ = | 55.78 |
| $r_9$ = | −219.349 | $d_9$ = | 0.29 | | | | |
| $r_{10}$ = | −1886.759 | $d_{10}$ = | 3.65 | $n_6$ = | 1.58144 | $\nu_6$ = | 40.75 |
| $r_{11}$ = | −39.872 | $d_{11}$ = | 3.82 | | | | |
| $r_{12}$ = | −10.918 | $d_{12}$ = | 1.55 | $n_7$ = | 1.72916 | $\nu_7$ = | 54.68 |
| $r_{13}$ = | −48.249 | $d_{13}$ = | $D_2$ (variable) | | | | | aspherical surface coefficients

| | | | | | | | |
|---|---|---|---|---|---|---|---|
| (3rd surface) | K = | 22.142, | $A_4$ = | 1.15887 × 10⁻⁴, | $A_6$ = | 3.41453 × 10⁻⁷ | |
| | | | $A_8$ = | 2.99342 × 10⁻⁸, | $A_{10}$ = | −7.24684 × 10⁻¹⁰ | |
| | | | $A_{12}$ = | 9.31084 × 10⁻¹² | | | |
| (10th surface) | K = | 5.751, | $A_4$ = | 6.66471 × 10⁻⁵, | $A_6$ = | 1.67567 × 10⁻⁷ | |
| | | | $A_8$ = | 8.31432 × 10⁻⁹, | $A_{10}$ = | −1.42366 × 10⁻¹⁰ | |
| | | | $A_{12}$ = | 1.07706 × 10⁻¹² | | | |
| f | | 39.330 | | 70.103 | | 111.100 | |
| $D_1$ | | 14.51 | | 6.58 | | 2.84 | |
| $D_2$ | | 9.61 | | 37.60 | | 74.88 | |

-continued $$f_W = 39.3, f_T = 111.1, f_T/f_W = 2.825, f_{G1} = 27.95801$$
$$f_{L1} = -79.4815, f_{G1}/f_{L1} = -0.351755,$$
$$MGL/|f_2| = 0.0142 \text{ (1/mm)}, \nu_{2P} = 40.75, \nu_{1P}-\nu_{2P} = 19.95$$

Embodiment 6
$f = 39.301 \sim 70.051 \sim 111.012, F/4.76 \sim 7.60 \sim 10.90$

| | | | | | | | | |
|---|---|---|---|---|---|---|---|---|
| $r_1 =$ | 461.100 | $d_1 =$ | 1.45 | | $n_1 =$ | 1.69350 | $\nu_1 =$ | 53.20 |
| $r_2 =$ | 55.393 (aspherical surface) | $d_2 =$ | 3.97 | | | | | |
| $r_3 =$ | 58.251 | $d_3 =$ | 1.70 | | $n_2 =$ | 1.67270 | $\nu_2 =$ | 32.10 |
| $r_4 =$ | 18.388 | $d_4 =$ | 8.44 | | $n_3 =$ | 1.56384 | $\nu_3 =$ | 60.70 |
| $r_5 =$ | −14.685 | $d_5 =$ | 1.00 | | | | | |
| $r_6 =$ | ∞ (stop) | $d_6 =$ | $D_1$ (variable) | | | | | |
| $r_7 =$ | −98.256 | $d_7 =$ | 1.60 | | $n_4 =$ | 1.58313 | $\nu_4 =$ | 59.38 |
| $r_8 =$ | 43.393 (aspherical surface) | $d_8 =$ | 1.25 | | | | | |
| $r_9 =$ | 34.229 | $d_9 =$ | 3.71 | | $n_5 =$ | 1.54814 | $\nu_5 =$ | 45.79 |
| $r_{10} =$ | −43.523 | $d_{10} =$ | 4.39 | | | | | |
| $r_{11} =$ | −10.660 | $d_{11} =$ | 1.55 | | $n_6 =$ | 1.71300 | $\nu_6 =$ | 53.87 |
| $r_{12} =$ | −46.608 | $d_{12} =$ | $D_2$ (variable) | | | | | | aspherical surface coefficients (2nd surface) $K = 8.736$, $A_4 = 7.07980 \times 10^{-5}$, $A_6 = 3.47056 \times 10^{-7}$
$A_8 = -7.62762 \times 10^{-9}$, $A_{10} = -1.38761 \times 10^{-10}$
$A_{12} = 2.17801 \times 10^{-12}$ (8th surface) $K = -12.046$, $A_4 = -4.38457 \times 10^{-5}$, $A_6 = -2.55084 \times 10^{-7}$
$A_8 = -5.89430 \times 10^{-9}$, $A_{10} = 6.57033 \times 10^{-11}$
$A = -8.03235 \times 10^{-13}$

| $f$ | 39.301 | 70.051 | 111.012 |
|---|---|---|---|
| $D_1$ | 12.99 | 5.28 | 1.64 |
| $D_2$ | 9.12 | 36.50 | 72.98 |

$$f_W = 39.3, f_T = 111.0, f_T/f_W = 2.825, f_{G1} = 27.84127$$
$$f_{L1} = -90.9137, f_{G1}/f_{L1} = -0.3062396, D/|f_{G2}| = 0.050$$
$$\nu_{2P} = 45.79, \nu_{1P}-\nu_{2P} = 14.91$$

Embodiment 7
$f = 39.299 \sim 69.528 \sim 110.990, F/4.76 \sim 7.60 \sim 10.99$

| | | | | | | | | |
|---|---|---|---|---|---|---|---|---|
| $r_1 =$ | 104.803 | $d_1 =$ | 1.45 | | $n_1 =$ | 1.69350 | $\nu_1 =$ | 53.20 |
| $r_2 =$ | 34.457 (aspherical surface) | $d_2 =$ | 3.97 | | | | | |
| $r_3 =$ | 45.826 | $d_3 =$ | 1.70 | | $n_2 =$ | 1.69895 | $\nu_2 =$ | 30.13 |
| $r_4 =$ | 19.401 | $d_4 =$ | 8.44 | | $n_3 =$ | 1.51633 | $\nu_3 =$ | 64.14 |
| $r_5 =$ | −13.516 | $d_5 =$ | 1.00 | | | | | |
| $r_6 =$ | ∞ (stop) | $d_6 =$ | $D_1$ (variable) | | | | | |
| $r_7 =$ | −117.332 | $d_7 =$ | 1.74 | | $n_4 =$ | 1.63246 | $\nu_4 =$ | 63.78 |
| $r_8 =$ | 55.620 (aspherical surface) | $d_8 =$ | 1.25 | | | | | |
| $r_9 =$ | 29.778 | $d_9 =$ | 3.60 | | $n_5 =$ | 1.53172 | $\nu_5 =$ | 48.84 |
| $r_{10} =$ | −36.624 | $d_{10} =$ | 4.39 | | | | | |
| $r_{11} =$ | −11.525 | $d_{11} =$ | 1.58 | | $n_6 =$ | 1.72916 | $\nu_6 =$ | 54.68 |
| $r_{12} =$ | −131.720 | $d_{12} =$ | $D_2$ (variable) | | | | | | aspherical surface coefficients (2nd surface) $K = 8.738$, $A_4 = 5.85022 \times 10^{-5}$, $A_6 = 3.29986 \times 10^{-7}$
$A_8 = 1.34418 \times 10^{-8}$, $A_{10} = -3.19950 \times 10^{-10}$
$A_{12} = 4.33013 \times 10^{-12}$ (8th surface) $K = -12.046$, $A_4 = -3.71916 \times 10^{-5}$, $A_6 = -9.91111 \times 10^{-8}$
$A_8 = -8.10920 \times 10^{-9}$, $A_{10} = 9.65865 \times 10^{-11}$
$A_{12} = -7.35132 \times 10^{-13}$

| $f$ | 39.299 | 69.528 | 110.990 |
|---|---|---|---|
| $D_1$ | 13.84 | 5.40 | 1.31 |
| $D_2$ | 9.20 | 36.17 | 73.17 |

$$f_W = 39.3, f_T = 111.0, f_T/f_W = 2.824, f_{G1} = 29.23423$$
$$f_{L1} = -74.6533, f_{G1}/f_{L1} = -0.3916, D/|f_{G2}| = 0.048$$
$$\nu_{2P} = 48.84, \nu_{1P}-\nu_{2P} = 15.30$$

Embodiment 8
$f = 39.214 \sim 68.539 \sim 114.265, F/4.76 \sim 7.60 \sim 11.17$

| | | | | | | | | |
|---|---|---|---|---|---|---|---|---|
| $r_1 =$ | ∞ | $d_1 =$ | 1.45 | | $n_1 =$ | 1.69350 | $\nu_1 =$ | 53.20 |
| $r_2 =$ | 93.984 | $d_2 =$ | 3.72 | | | | | |
| $r_3 =$ | 186.818 | $d_3 =$ | 1.70 | | $n_2 =$ | 1.68893 | $\nu_2 =$ | 31.07 |
| $r_4 =$ | 21.234 | $d_4 =$ | 7.63 | | $n_3 =$ | 1.61272 | $\nu_3 =$ | 58.72 |

-continued

| | | | | | | | |
|---|---|---|---|---|---|---|---|
| $r_5 =$ | −14.280 | $d_5 =$ | 1.00 | | | | |
| $r_6 =$ | ∞ (stop) | $d_6 =$ | $D_1$ (variable) | | | | |
| $r_7 =$ | 573.340 | $d_7 =$ | 1.70 | $n_4 =$ | 1.61800 | $\nu_4 =$ | 63.33 |
| $r_8 =$ | 40.656 | $d_8 =$ | 0.50 | | | | |
| $r_9 =$ | 72.595 (aspherical surface) | $d_9 =$ | 4.05 | $n_5 =$ | 1.54072 | $\nu_5 =$ | 47.23 |
| $r_{10} =$ | −35.555 (aspherical surface) | $d_{10} =$ | 4.09 | | | | |
| $r_{11} =$ | −9.472 | $d_{11} =$ | 1.52 | $n_6 =$ | 1.69680 | $\nu_6 =$ | 55.53 |
| $r_{12} =$ | −39.458 | $d_{12} =$ | $D_2$ (variable) | | | | | aspherical surface coefficients (2nd surface) $K = 8.723$, $A_4 = 9.14303 \times 10^{-5}$, $A_6 = 5.13349 \times 10^{-7}$
$A_8 = 1.20666 \times 10^{-8}$, $A_{10} = -3.54748 \times 10^{-10}$
$A_{12} = 0.03432 \times 10^{-12}$ (9th surface) $K = -7.567$, $A_4 = 6.41926 \times 10^{-5}$, $A_6 = 7.80941 \times 10^{-7}$
$A_8 = -9.78766 \times 10^{-10}$, $A_{10} = 1.16969 \times 10^{-10}$ (10th surface) $K = 0$, $A_4 = -3.36938 \times 10^{-5}$, $A_6 = 6.53076 \times 10^{-7}$
$A_8 = -2.16190 \times 10^{-8}$, $A_{10} = 3.17099 \times 10^{-10}$

| | | | |
|---|---|---|---|
| f | 39.214 | 68.539 | 114.265 |
| $D_1$ | 11.19 | 4.91 | 1.55 |
| $D_2$ | 10.25 | 35.18 | 74.05 |

$f_W = 39.2$, $f_T = 114.3$, $f_T/f_W = 2.914$, $f_{G1} = 26.0213$
$f_{L1} = -135.521$, $f_{G1}/f_{L1} = -0.19201$, $\nu_{2P} = 47.23$, $\nu_{1P}-\nu_{2P} = 11.49$

Embodiment 9
$f = 39.300 \sim 69.852 \sim 114.999$, F/4.76~7.60~11.14

| | | | | | | | |
|---|---|---|---|---|---|---|---|
| $r_1 =$ | 229.354 | $d_1 =$ | 1.45 | $n_1 =$ | 1.69350 | $\nu_1 =$ | 53.20 |
| $r_2 =$ | 64.252 (aspherical surface) | $d_2 =$ | 3.65 | | | | |
| $r_3 =$ | 98.735 | $d_3 =$ | 1.70 | $n_2 =$ | 1.67270 | $\nu_2 =$ | 32.10 |
| $r_4 =$ | 19.938 | $d_4 =$ | 7.98 | $n_3 =$ | 1.56384 | $\nu_3 =$ | 60.70 |
| $r_5 =$ | −13.933 | $d_5 =$ | 1.00 | | | | |
| $r_6 =$ | ∞ (stop) | $d_6 =$ | $D_1$ (variable) | | | | |
| $r_7 =$ | −61.590 | $d_7 =$ | 1.60 | $n_4 =$ | 1.58313 | $\nu_4 =$ | 59.38 |
| $r_8 =$ | 82.135 (aspherical surface) | $d_8 =$ | 0.96 | | | | |
| $r_9 =$ | 50.096 | $d_9 =$ | 3.72 | $n_5 =$ | 1.54814 | $\nu_5 =$ | 45.79 |
| $r_{10} =$ | −34.881 | $d_{10} =$ | 4.52 | | | | |
| $r_{11} =$ | −9.903 (aspherical surface) | $d_{11} =$ | 1.55 | $n_6 =$ | 1.71300 | $\nu_6 =$ | 53.87 |
| $r_{12} =$ | −42.540 | $d_{12} =$ | $D_2$ (variable) | | | | | aspherical surface coefficients (2nd surface) $K = 8.736$, $A_4 = 8.26111 \times 10^{-5}$, $A_6 = 4.49796 \times 10^{-7}$
$A_8 = 5.40741 \times 10^{-9}$, $A_{10} = 2.28243 \times 10^{-11}$ (8th surface) $K = -12.047$, $A_4 = -6.31438 \times 10^{-5}$, $A_6 = -4.92012 \times 10^{-7}$
$A_8 = 5.21615 \times 10^{-9}$, $A_{10} = -1.44081 \times 10^{-10}$ (11th surface) $K = 0$, $A_4 = 1.33628 \times 10^{-5}$, $A_6 = -5.57217 \times 10^{-8}$
$A_8 = 5.34173 \times 10^{-9}$, $A_{10} = -2.55185 \times 10^{-12}$

| | | | |
|---|---|---|---|
| f | 39.300 | 69.852 | 114.999 |
| $D_1$ | 12.47 | 5.34 | 1.75 |
| $D_2$ | 9.12 | 35.15 | 73.63 |

$f_W = 39.3$, $f_T = 115.0$, $f_T/f_W = 2.926$, $f_{G1} = 27.4042$
$F_{L1} = -129.169$, $f_{G1}/f_{L1} = -0.212157$, $D/|f_{G2}| = 0.041$
$\mu_{2P} = 45.79$, $\nu_{1P}-\nu_{2P} = 14.91$

Embodiment 10
$f = 39.320 \sim 69.855 \sim 125.595$, F/4.86~7.86~12.78

| | | | | | | | |
|---|---|---|---|---|---|---|---|
| $r_1 =$ | 689.141 | $d_1 =$ | 1.50 | $n_1 =$ | 1.80610 | $\nu_1 =$ | 40.73 |
| $r_2 =$ | 57.969 (aspherical surface) | $d_2 =$ | 5.71 | | | | |
| $r_3 =$ | 81.167 | $d_3 =$ | 1.59 | $n_2 =$ | 1.67270 | $\nu_2 =$ | 32.10 |
| $r_4 =$ | 25.787 | $d_4 =$ | 4.74 | $n_3 =$ | 1.56384 | $\nu_3 =$ | 60.70 |
| $r_5 =$ | −13.975 | $d_5 =$ | 1.00 | | | | |
| $r_6 =$ | ∞ (stop) | $d_6 =$ | $D_1$ (variable) | | | | |
| $r_7 =$ | −84.149 (aspherical surface) | $d_7 =$ | 2.00 | $n_4 =$ | 1.52542 | $\nu_4 =$ | 55.78 |
| $r_8 =$ | −236.129 | $d_8 =$ | 0.39 | | | | |
| $r_9 =$ | −1331.610 | $d_9 =$ | 3.25 | $n_5 =$ | 1.58144 | $\nu_5 =$ | 40.75 |

-continued

| | | | | | | | |
|---|---|---|---|---|---|---|---|
| $r_{10} =$ | −41.906 | $d_{10} =$ | 4.04 | | | | |
| $r_{11} =$ | −11.038 | $d_{11} =$ | 1.55 | $n_6 =$ | 1.72916 | $\nu_6 =$ | 54.68 |
| $r_{12} =$ | −47.950 | $d_{12} =$ | $D_2$ (variable) | | | | | aspherical surface coefficients (2nd surface) $K = 72.859$, $A_4 = 3.22274 \times 10^{-5}$, $A_6 = 4.62585 \times 10^{-7}$
$A_8 = -4.86977 \times 10^{-8}$, $A_{10} = 1.82364 \times 10^{-9}$
$A_{12} = -3.17805 \times 10^{-11}$ (7th surface) $K = -83.787$, $A_4 = 4.51047 \times 10^{-5}$, $A_6 = 1.68665 \times 10^{-7}$
$A_8 = 8.48532 \times 10^{-9}$, $A_{10} = -9.34580 \times 10^{-11}$
$A_{12} = 3.41451 \times 10^{-13}$

| | | | |
|---|---|---|---|
| f | 39.320 | 69.855 | 125.595 |
| $D_1$ | 14.17 | 6.34 | 1.86 |
| $D_2$ | 9.85 | 37.79 | 88.80 |

$f_W = 39.3$, $f_T = 125.6$, $f_T/f_W = 3.194$, $f_{G1} = 27.75506$
$f_{L1} = -78.6004$, $f_{G1}/f_{L1} = -0.353116$,
$MGL/|f_{21}| = 0.0160$ (1/mm), $\nu_{2P} = 40.75$, $\nu_{1P}-\nu_{2P} = 19.95$

Embodiment 11
$f = 39.330\sim70.103\sim111.101$, F/4.86$\sim$7.88$\sim$11.30

| | | | | | | | |
|---|---|---|---|---|---|---|---|
| $r_1 =$ | ∞ | $d_1 =$ | 1.35 | $n_1 =$ | 1.80610 | $\nu_1 =$ | 40.92 |
| $r_2 =$ | 50.00 | $d_2 =$ | 0.15 | $n_2 =$ | 1.52540 | $\nu_2 =$ | 51.81 |
| $r_3 =$ | 75.448 (aspherical surface) | $d_3 =$ | 5.81 | | | | |
| $r_4 =$ | 78.530 | $d_4 =$ | 1.60 | $n_3 =$ | 1.67270 | $\nu_3 =$ | 32.10 |
| $r_5 =$ | 25.141 | $d_5 =$ | 4.26 | $n_4 =$ | 1.56384 | $\nu_4 =$ | 60.70 |
| $r_6 =$ | −14.064 | $d_6 =$ | 1.00 | | | | |
| $r_7 =$ | ∞ (stop) | $d_7 =$ | $D_1$ (variable) | | | | |
| $r_8 =$ | −81.768 | $d_8 =$ | 2.10 | $n_5 =$ | 1.52542 | $\nu_5 =$ | 55.78 |
| $r_9 =$ | −219.349 (aspherical surface) | $d_9 =$ | 1.40 | | | | |
| $r_{10} =$ | −435.411 | $d_{10} =$ | 3.65 | $n_6 =$ | 1.58144 | $\nu_6 =$ | 40.75 |
| $r_{11} =$ | −39.792 | $d_{11} =$ | 4.13 | | | | |
| $r_{12} =$ | −10.747 | $d_{12} =$ | 1.55 | $n_7 =$ | 1.72916 | $\nu_7 =$ | 54.68 |
| $r_{13} =$ | −42.695 | $d_{13} =$ | $D_2$ (variable) | | | | | aspherical surface coefficients (3rd surface) $K = 22.136$, $A_4 = 1.18773 \times 10^{-4}$, $A_6 = 3.52377 \times 10^{-7}$
$A_8 = 3.25106 \times 10^{-8}$, $A_{10} = -8.02587 \times 10^{-10}$
$A_{12} = 1.02165 \times 10^{-11}$ (9th surface) $K = 0$, $A_4 = -6.55677 \times 10^{-5}$, $A_6 = -2.79767 \times 10^{-7}$
$A_8 = -1.38446 \times 10^{-9}$, $A_{10} = -3.26987 \times 10^{-11}$

| | | | |
|---|---|---|---|
| f | 39.330 | 70.103 | 111.101 |
| $D_1$ | 13.16 | 5.32 | 1.63 |
| $D_2$ | 9.54 | 37.52 | 74.81 |

$f_W = 39.3$, $f_T = 111.1$, $f_T/f_W = 2.827$, $f_{G1} = 27.77492$
$f_{L1} = -79.4815$, $f_{G1}/f_{L1} = -0.349451$,
$MGL/|f_{21}| = 0.0142$ (1/mm),
$D/|f_{G2}| = -0.055$, $\nu_{2P} = 40.75$, $\nu_{1P}-\nu_{2P} = 19.95$

Embodiment 12
$f = 39.320\sim62.370\sim111.114$, F/4.76$\sim$6.99$\sim$11.23

| | | | | | | | |
|---|---|---|---|---|---|---|---|
| $r_1 =$ | 59.331 | $d_1 =$ | 1.50 | $n_1 =$ | 1.80610 | $\nu_1 =$ | 40.73 |
| $r_2 =$ | 57.811 aspherical surface | $d_2 =$ | 3.68 | | | | |
| $r_3 =$ | 148.429 | $d_3 =$ | 1.40 | $n_2 =$ | 1.69895 | $\nu_2 =$ | 30.13 |
| $r_4 =$ | 21.544 | $d_4 =$ | 2.20 | | | | |
| $r_5 =$ | 31.905 | $d_5 =$ | 4.14 | $n_3 =$ | 1.53996 | $\nu_3 =$ | 59.46 |
| $r_6 =$ | −12.580 | $d_6 =$ | 1.00 | | | | |
| $r_7 =$ | ∞ (stop) | $d_7 =$ | $D_1$ (variable) | | | | |
| $r_8 =$ | −68.507 aspherical surface | $d_8 =$ | 2.00 | $n_4 =$ | 1.52542 | $\nu_4 =$ | 55.78 |
| $r_9 =$ | −143.540 | $d_9 =$ | 0.55 | | | | |
| $r_{10} =$ | 208.373 | $d_{10} =$ | 2.94 | $n_5 =$ | 1.58144 | $\nu_5 =$ | 40.75 |
| $r_{11} =$ | −57.945 | $d_{11} =$ | 4.12 | | | | |
| $r_{12} =$ | −10.790 | $d_{12} =$ | 1.40 | $n_6 =$ | 1.69680 | $\nu_6 =$ | 55.53 |
| $r_{13} =$ | −53.119 | $d_{13} =$ | $D_2$ (variable) | | | | | aspherical surface coefficients (2nd surface) $K = 69.088$, $A_4 = 3.91897 \times 10^{-5}$, $A_6 = 7.91371 \times 10^{-7}$
$A_8 = -5.30860 \times 10^{-8}$, $A_{10} = 1.81211 \times 10^{-9}$
$A_{12} = -2.68485 \times 10^{-11}$ -continued

| | | | | |
|---|---|---|---|---|
| (8th surface) | K = −98.217, | $A_4$ = 2.97785 × 10$^{-5}$, | $A_6$ = 2.24204 × 10$^{-7}$ | |
| | | $A_8$ = 1.98202 × 10$^{-8}$, | $A_{10}$ = −3.37356 × 10$^{-10}$ | |
| | | $A_{12}$ = 2.03373 × 10$^{-12}$ | | |
| f | 39.320 | | 62.370 | 111.114 |
| $D_1$ | 13.18 | | 6.80 | 2.03 |
| $D_2$ | 9.90 | | 30.43 | 73.85 |

$f_W$ = 39.3, $f_T$ = 111.1, $f_T/f_W$ = 2.826, $f_{G1}$ = 27.60184
$f_{L1}$ = −77.305, $f_{G1}/f_{L1}$ = −0.357051,
MGL/|$f_{21}$| = 0.0142 (1/mm), $\mu_{2P}$ = 40.75, $\nu_{1P}$−$\nu_{2P}$ = 18.71 wherein reference symbols $r_1$, $r_2$, . . . represent radii of curvature on surfaces of respective lens elements, reference symbols $d_1$, $d_2$, . . . designate thicknesses of the respective lens elements and airspaces reserved therebetween, reference symbols $n_1$, $n_2$, . . . denote refractive indices of the respective lens elements for the d-line, reference symbols $v_1$, $v_2$, . . . represent Abbe's numbers of the respective lens elements, a reference symbol f designates focal lengths of the lens system as a whole at a wide position, an intermediate focal length and a tele position, and a reference symbol F/denote F numbers at the wide position, the intermediate focal length and the tele position. In addition, length such as the radii of curvature ($r_1$, $r_2$, . . . ), the thicknesses and the airspaces ($d_1$, $d_2$, . . . ) are specified in a unit of millimeter.

The first embodiment has a composition illustrated in FIG. 1, or is a zoom lens system which comprises, in order from the object side, a first lens unit G1 having positive refractive power, an aperture stop S and a second lens unit G2 having negative refractive power, and is configured to change a magnification from the wide position to the tele position by moving the first lens unit G1 and the second lens unit G2 respectively toward the object side while narrowing an airspace between the aperture stop S and the second lens unit G2.

Furthermore, the first lens unit G1 comprises, in order from the object side, a first subunit which is composed of a negative lens component L11 and a lens component L12 having weak refractive power, and a second subunit which has positive refractive power and is composed of a cemented lens component L13 consisting of a negative lens element and a positive lens element. The second lens unit G2 comprises, in order from the object side, a first negative lens component L21, a second positive lens component L22 and a third negative lens component L23.

Furthermore, the lens component L12 having the weak refractive power which is disposed in the first lens unit is a molded resin aspherical lens component having an aspherical object side surface $r_3$. This molded resin aspherical lens component L12 is made of a material having a low hygroscopicity which reduces a variation in a highly humid environment. Furthermore, the first negative lens component L21 disposed in the second lens unit G2 is a composite type aspherical lens component having an object side surface $r_{10}$ on which an aspherical resin layer having an aspherical surface $r_9$ is disposed.

Figure 2:
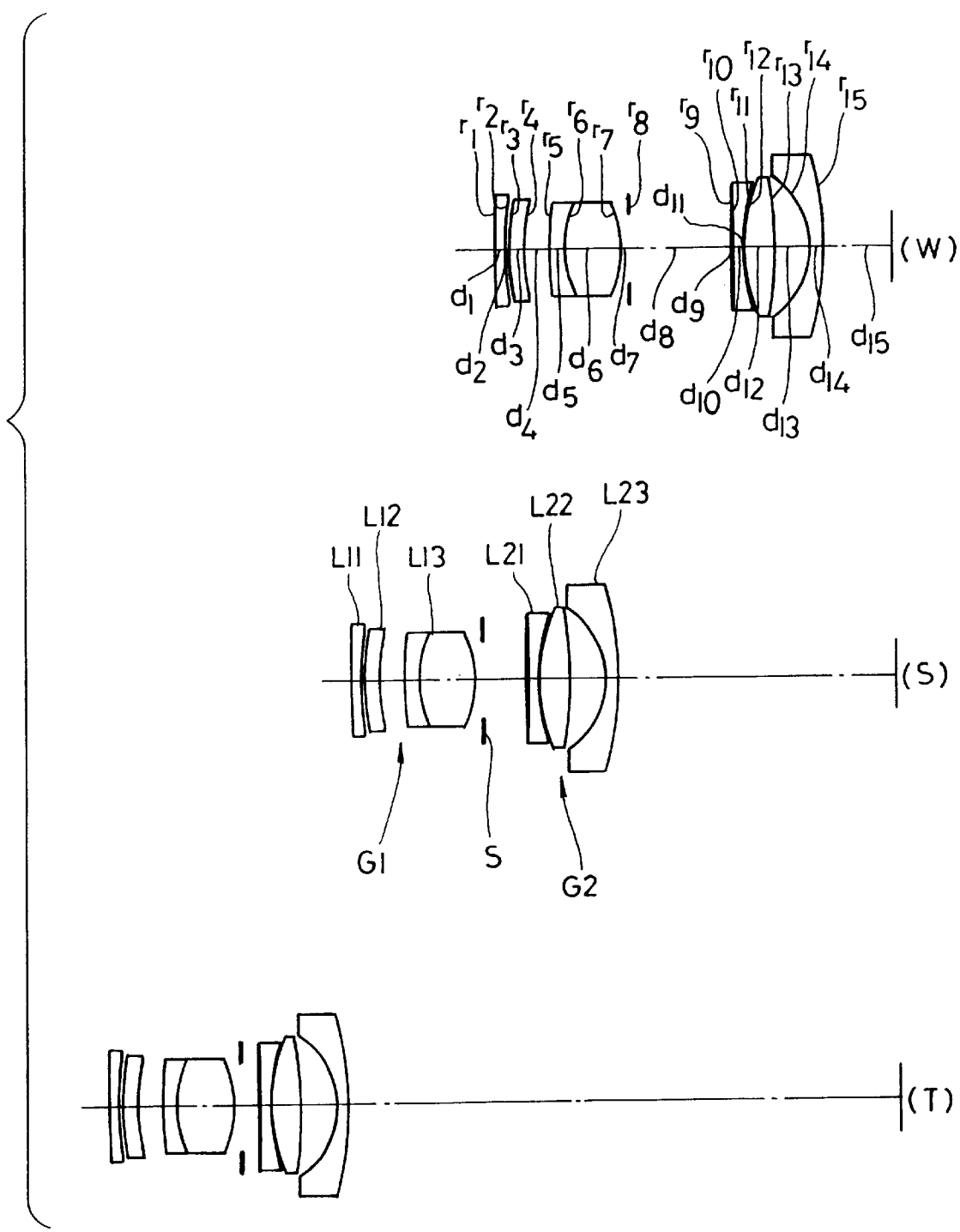

The second embodiment is a zoom lens system which has a composition illustrated in FIG. 2, or comprises, in order from the object side, a first lens unit G1 having positive refractive power, an aperture stop S and a second lens unit G2 having negative refractive power, and is configured to change a magnification from the wide position to the tele position by moving the first lens unit G1 and the second lens unit G2 respectively toward the object side while narrowing an airspace between the stop S and the second lens unit G2.

The first lens unit G1 comprises, in order from the object side, a first subunit which is composed of a negative lens component L11 and a lens component L12 having weak refractive power, and a second subunit which has positive refractive power as a whole and is composed of a cemented lens component L13 consisting of a negative lens element and a positive lens element. Furthermore, the second lens unit G2 comprises, in order from the object side, a first negative lens component L21, a second positive lens component L22 and a third negative lens component L23.

The lens component L12 having the weak refractive power which is disposed in the first lens unit G1 is a molded resin aspherical lens component made of a material having a low hygroscopicity to reduce a variation in a humid environment. This molded resin aspherical lens component has an aspherical object side surface $r_3$. Furthermore, the negative lens component L21 which is disposed on the object side in the second lens unit is a composite type aspherical lens component which has an aspherical surface $r_9$ located on an object side surface $r_{10}$.

Figure 3:
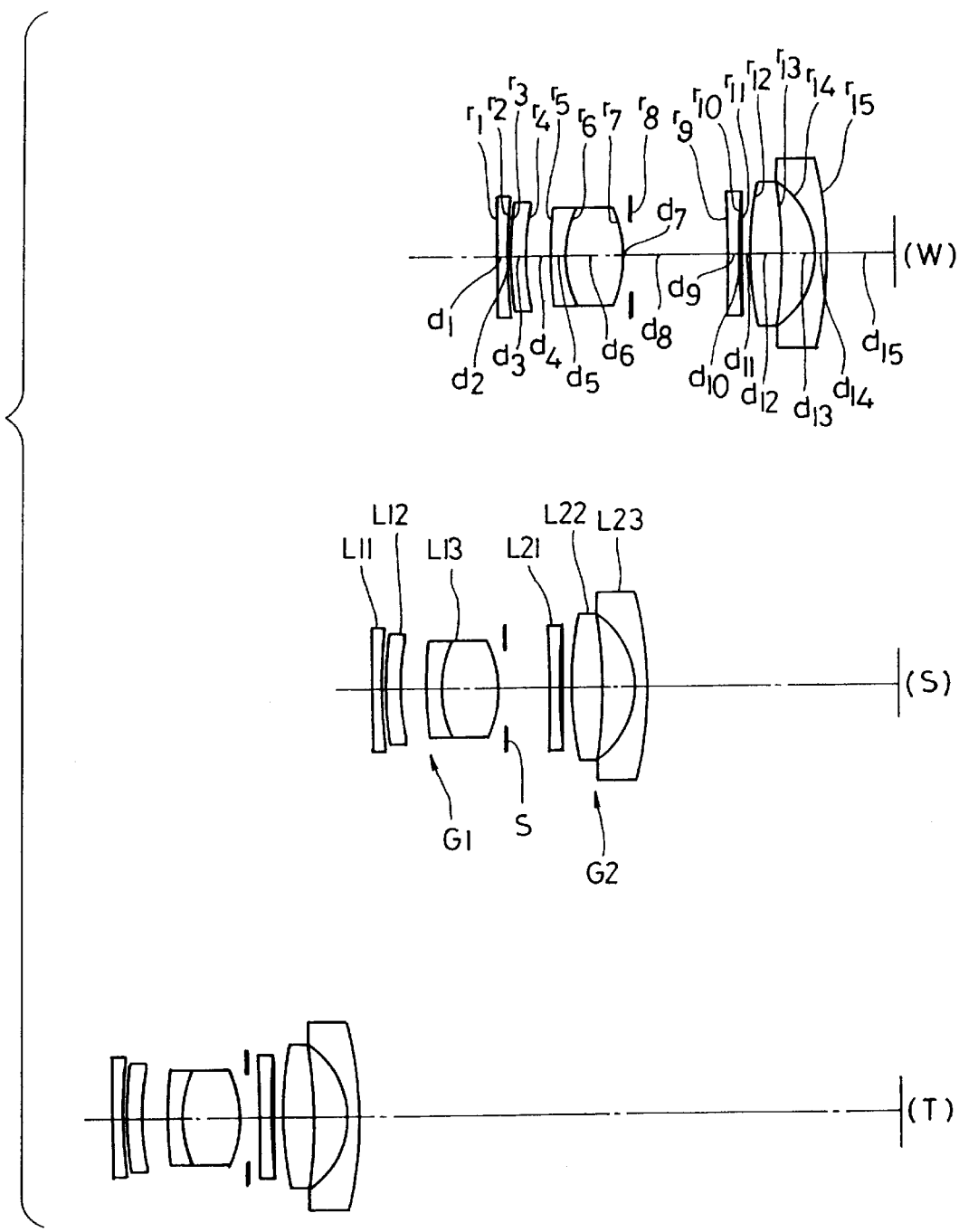

The third embodiment is a zoom lens system shown in FIG. 3 which comprises, in order from the object side, a first lens unit G1 having positive refractive power, an aperture stop S and a second lens unit G2 having negative refractive power, and is configured to change a magnification from the wide position to the tele position by moving the first lens unit G1 and the second lens unit G2 respectively toward the object side while narrowing an airspace between the stop S and the second lens unit G2.

The first lens unit G1 comprises, in order from the object side, a first subunit which is composed of a negative lens component L11 and a lens component L12 having weak refractive power, and a second subunit which has positive refractive power as a whole and is composed of a cemented lens component L13 consisting of a negative lens element and a positive lens element, whereas the second lens unit G2 comprises, in order from the object side, a first negative lens component L21, a second positive lens component L22 and a third negative lens component L23.

The lens component L12 having the weak refractive power which is disposed in the first lens unit G1 is a molded resin aspherical lens component which has an aspherical object side surface $r_3$ and is made of a material having a low hygroscopicity to reduce a variation in a humid environment. Furthermore, the first negative lens component L21 which is disposed on the object side in the second lens unit G2 is a composite type aspherical lens component which has an aspherical surface $r_9$ disposed on an object side surface $r_{10}$.

Figure 4:
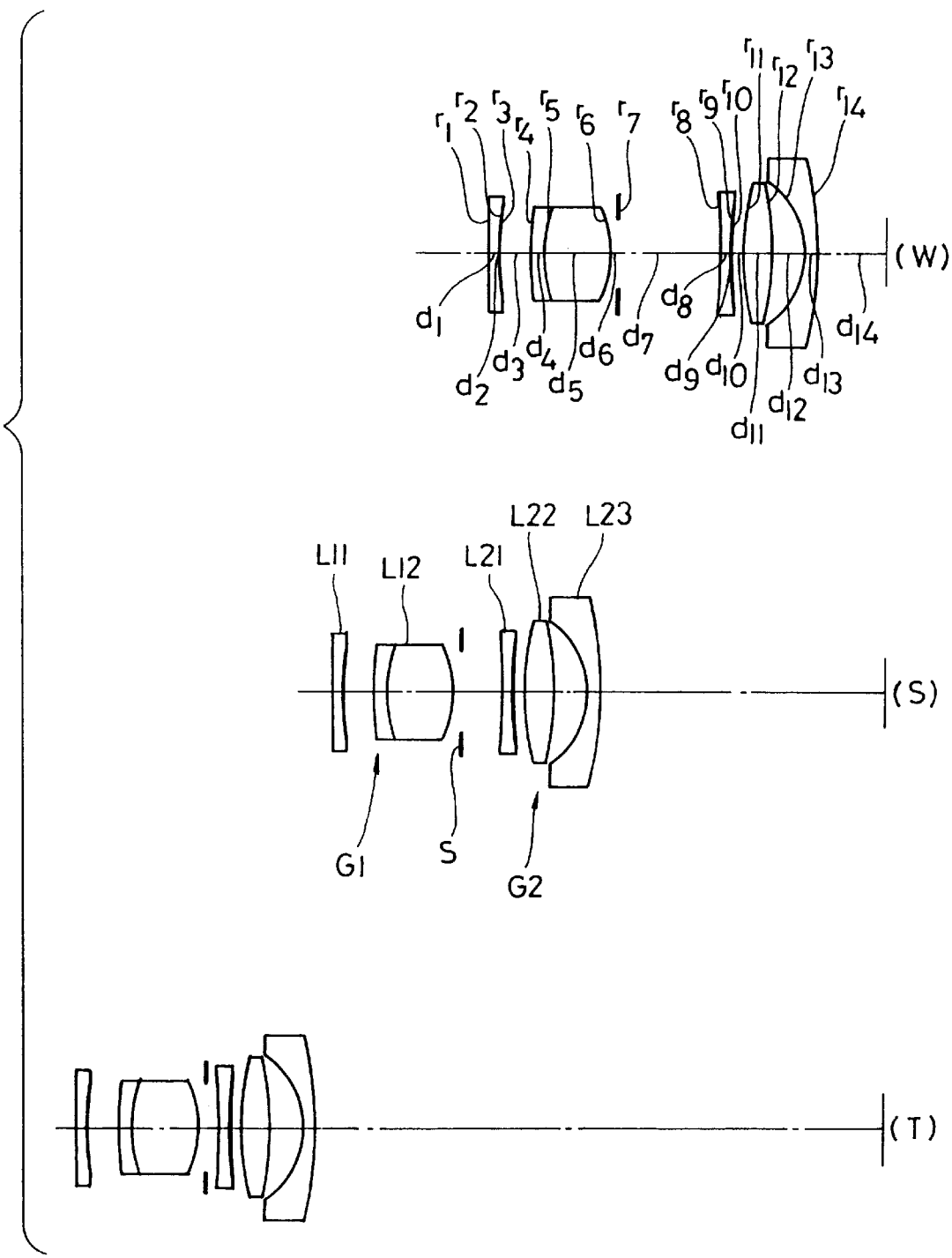

The fourth embodiment has a composition illustrated in FIG. 4, or comprises, in order from the object side, a first lens unit G1 having positive refractive power, an aperture stop S and a second lens unit G2 having negative refractive power, and is configured to change a magnification from the wide position to the tele position by moving the first lens unit G1 and the second lens unit G2 toward the object side while narrowing an airspace between the stop S and the second lens unit G2.

The first lens unit G1 comprises, in order from the object side, a first subunit which is composed of a negative lens element L11, and a second subunit which has positive refractive power and is composed of a cemented lens component L12 consisting of a negative lens element and a positive lens element, whereas the second lens unit G2 comprises, in order from the object side, a first negative lens component L21, a second positive lens component L22 and a third negative lens component L23.

The negative lens component L11 which is disposed in the first lens unit G1 is a composite type aspherical lens component which has a resin layer having an aspherical surface $r_3$ disposed on the image side of an image side surface $r_2$. Furthermore, the first negative lens component L21 which is disposed in the second lens unit G2 is a composite type aspherical lens component having resin layer which has an aspherical image side surface $r_{10}$ disposed on an image side surface $r_9$.

Figure 5:
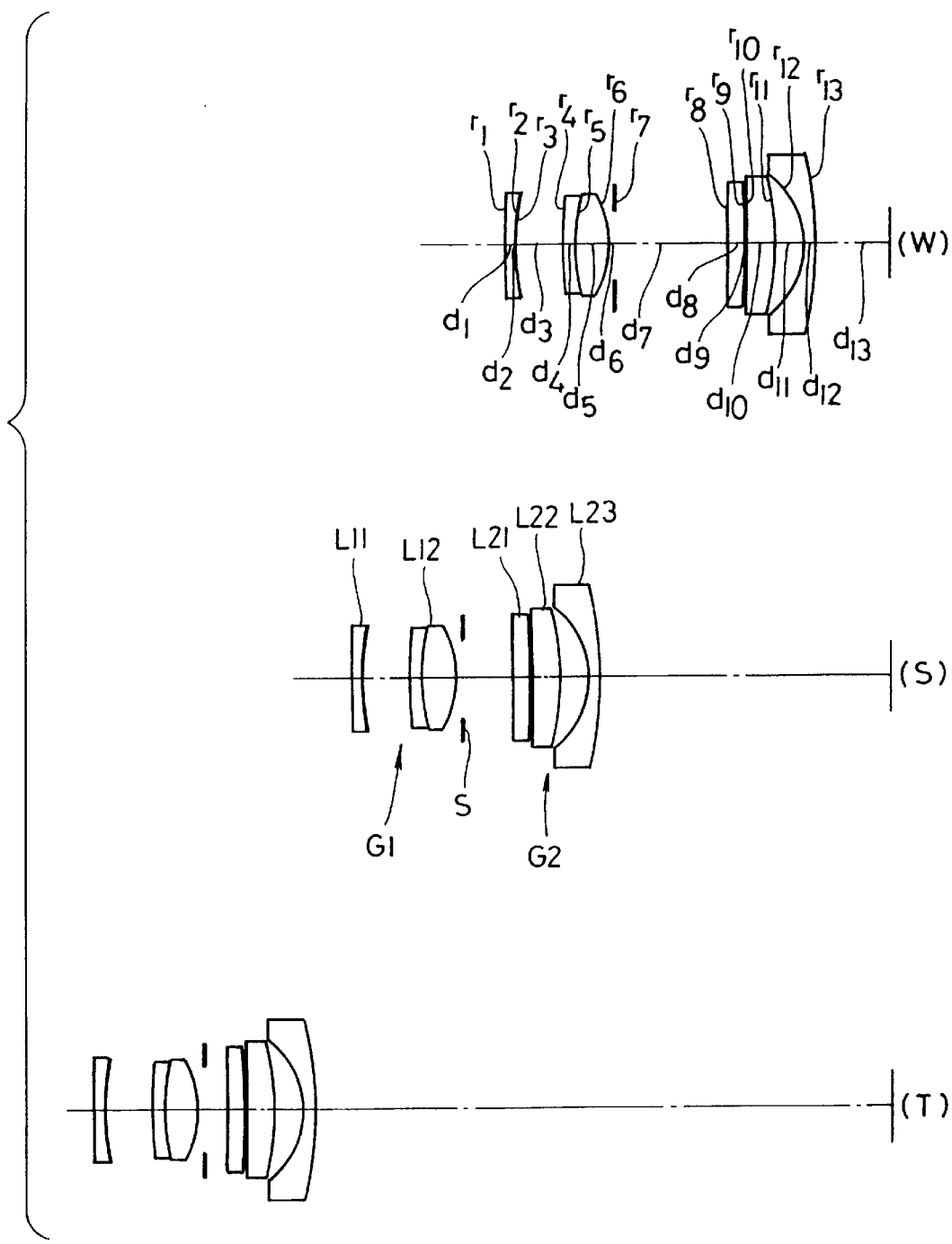

The fifth embodiment has a composition illustrated in FIG. 5, or comprises in order from the object side, a first lens G1 unit having positive refractive power, an aperture stop and a second lens unit G2 having negative refractive power, and is configured to change a magnification from the wide position to the tele position by moving the first lens unit G1 and the second lens unit G2 toward the object side while narrowing an airspace between the stop S and the second lens unit G2.

The first lens unit G1 comprises, in order from the object side, a first subunit which is composed of a negative lens component L11, and a second subunit which has positive refractive power and is composed of a cemented lens component L12 consisting of a negative lens element and a positive lens element, whereas the second lens unit G2 comprises, in order from the object side, a first negative lens component L21, a second positive lens component L22 and a third negative lens component L23.

The negative lens component L11 which is disposed in the first lens unit G1 is a composite type aspherical lens component which has a resin layer having an aspherical surface $r_3$ disposed on the image side of an image side surface $r_2$. Furthermore, the first negative lens component L21 which is disposed in the second lens unit G2 is a molded resin aspherical lens component having an aspherical object side surface $r_8$. This aspherical lens component L21 is made of a material having a low hygroscopicity and is varied little in a humid environment.

Figure 6:
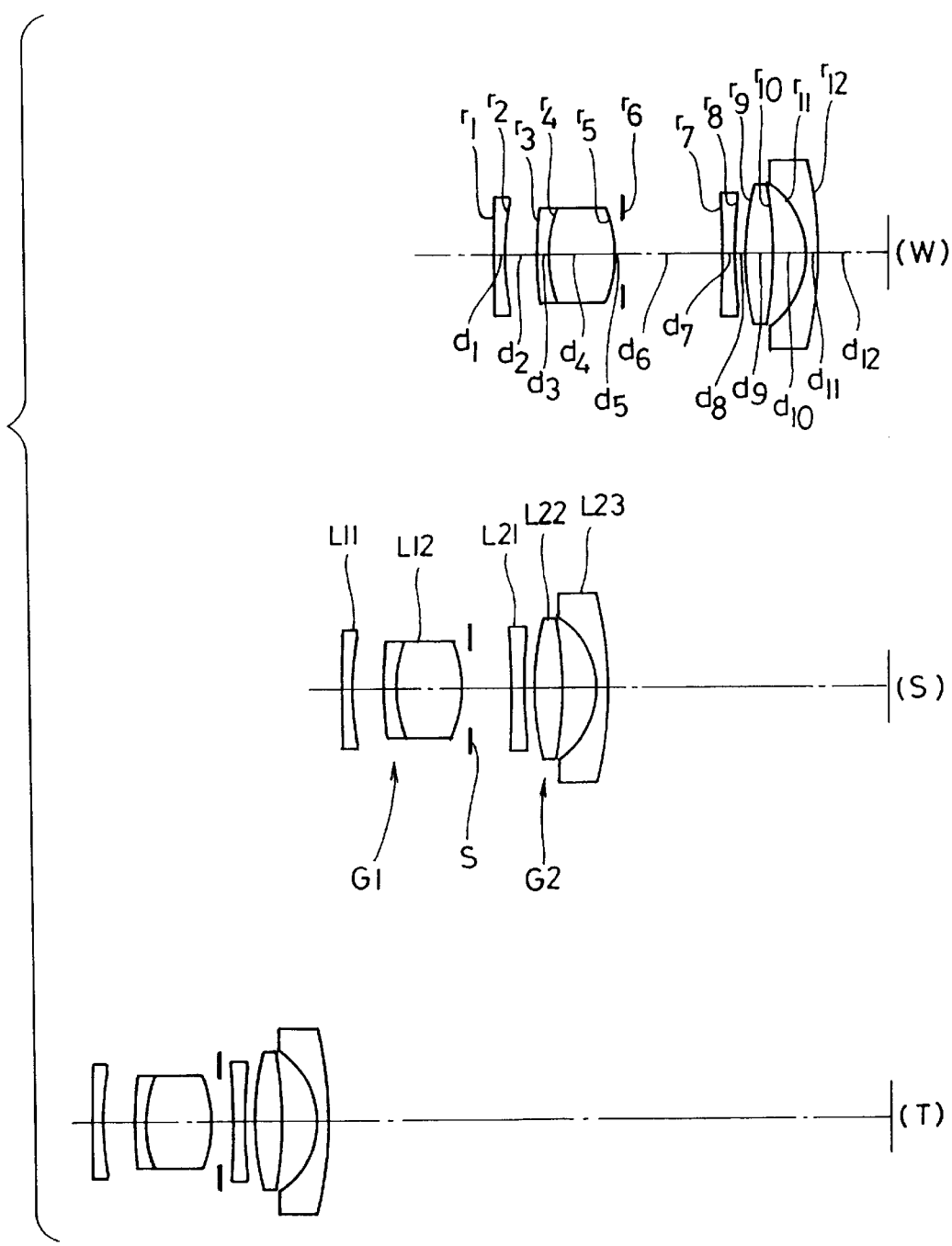

The sixth embodiment has a composition illustrated in FIG. 6, or comprises, in order from the object side, a first lens unit G1 having positive refractive power, an aperture stop S and a second lens unit G2 having negative refractive power, and is configured to change a magnification by moving the first lens unit G1 and the second lens unit G2 toward the object side while narrowing an airspace between the stop S and the second lens unit G2.

The first lens unit G1 comprises, in order from the object side, a first subunit which is composed of a negative lens component L11, and a second subunit which has positive refractive power and is composed of a cemented lens component L12 consisting of a negative lens element and a positive lens element. Furthermore, the second lens unit G2 comprises, in order from the object side, a first negative lens component L21, a second positive lens component L22 and a third negative lens component L23.

Both the negative lens component L11 which is disposed in the first lens unit G1 and the first negative lens component L21 which is disposed on the object side in the second lens unit G2 are molded glass aspherical lens components which have aspherical surfaces $r_2$ and $r_8$.

Figure 7:
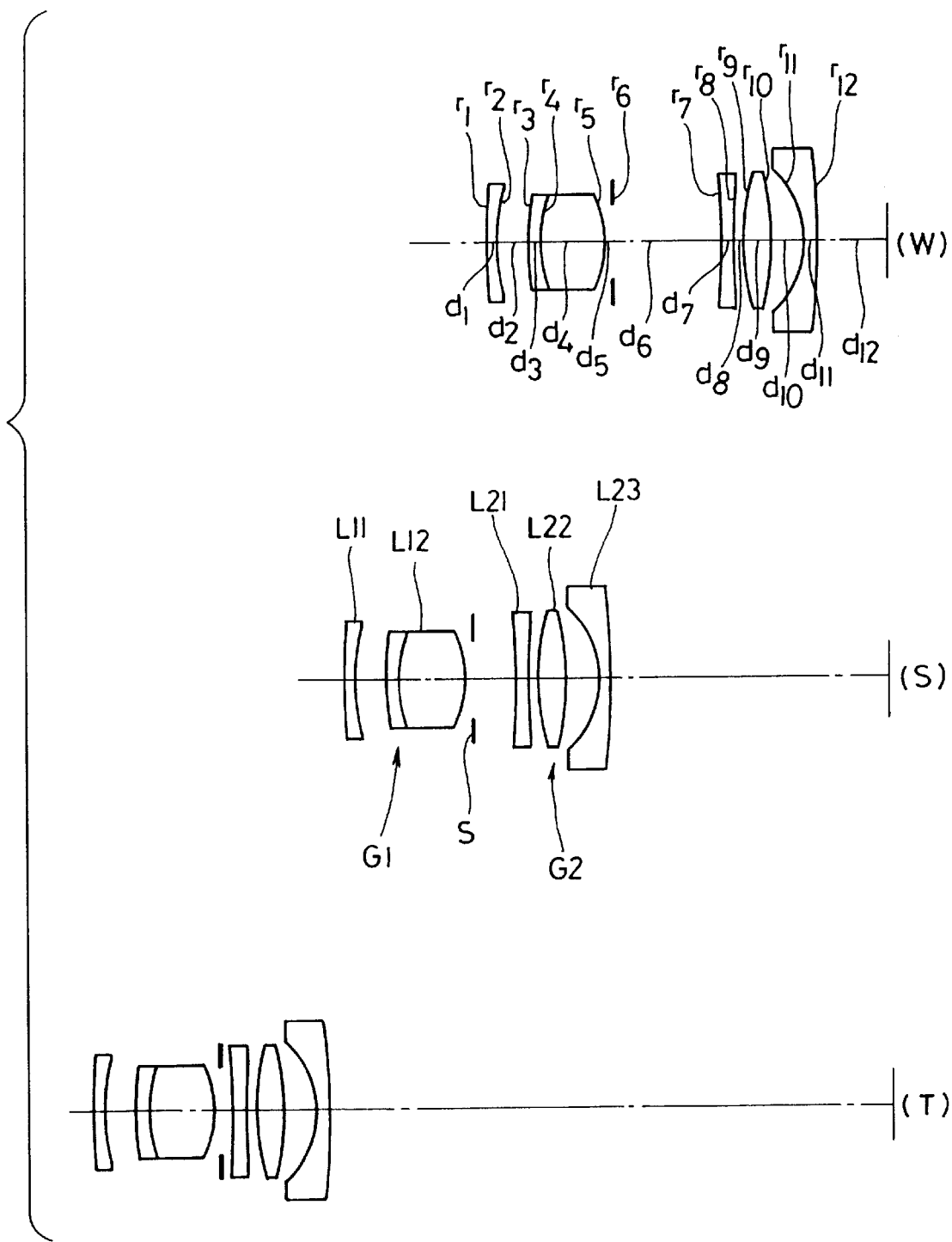

The seventh embodiment has a composition illustrated in FIG. 7, or comprises, in order from the object side, a first lens unit G1 having positive refractive power, an aperture stop S and a second lens unit G2 having negative refractive power, and is configured to change a magnification by moving the first lens unit G1 and the second lens unit G2 toward the object side while narrowing an airspace between the stop S and the second lens unit G2.

The first lens unit G1 comprises, in order from the object side, a first subunit which is composed of a negative lens component L11, and a second subunit which has positive refractive power and is composed of a cemented lens component L12 consisting of a negative lens element and a positive lens element. Furthermore, the second lens unit G2 comprises, in order from the object side, a first negative lens component L21, a second positive lens component L22 and a third negative lens component L23.

Both the negative lens component L11 which is disposed in the first lens unit G1 and the first negative lens component L21 which is disposed on the object side in the second lens unit G2 are molded glass aspherical lens components which have aspherical surfaces $r_2$ and $r_8$.

Figure 8:
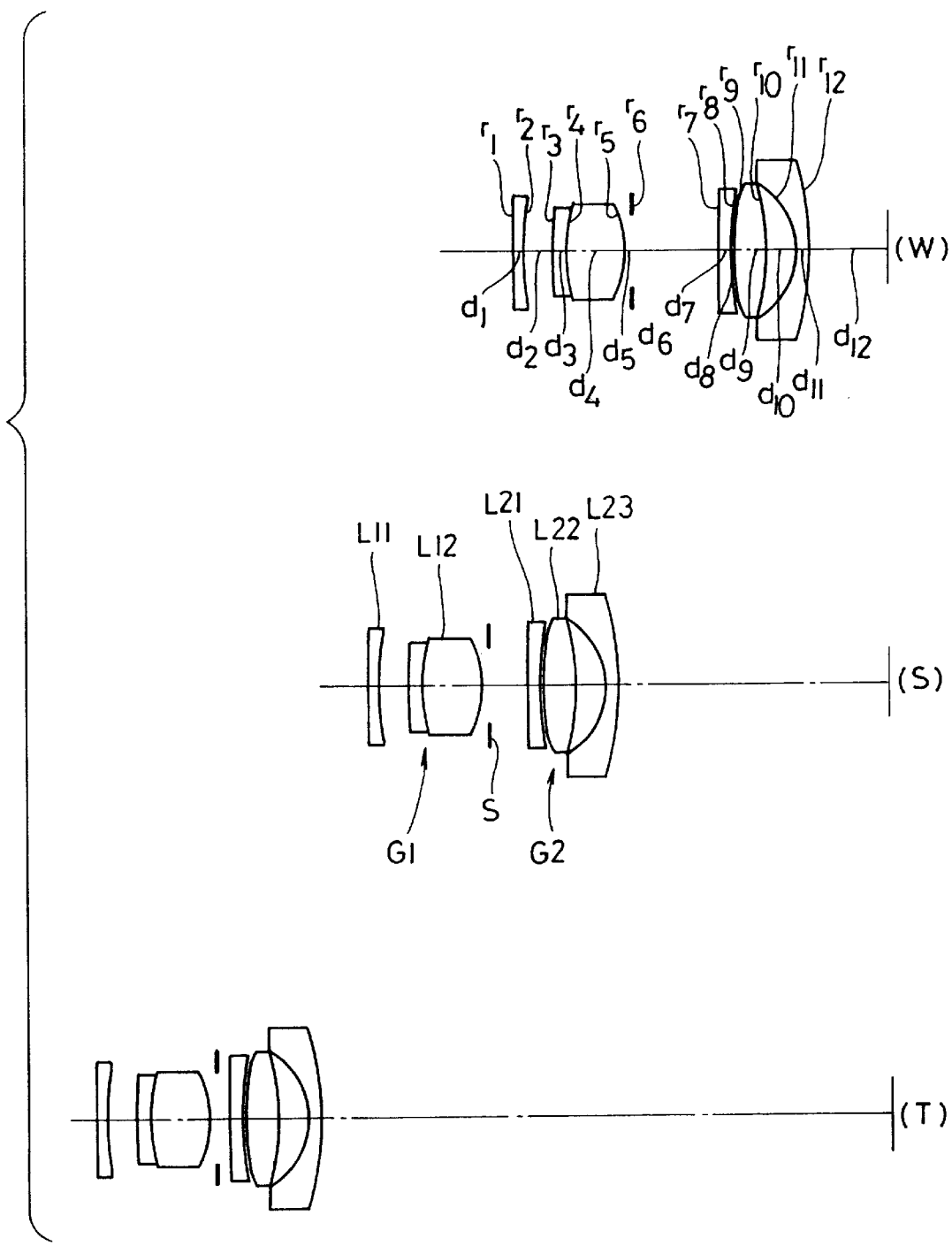

The eighth embodiment has a composition illustrated in FIG. 8, or comprises, in order from the object side, a first lens unit G1 having positive refractive power, an aperture stop S and a second lens unit G2 having negative refractive power, and is configured to change a magnification by moving the first lens unit G1 and the second lens unit G2 toward the object side while narrowing an airspace between the stop S and the second lens unit G2.

The first lens unit G1 comprises, in order from the object side, a first subunit which is composed of a negative lens component L11, and a second subunit which has positive refractive power and is composed of a cemented lens component L12 consisting of a negative lens element and a positive lens element. Furthermore, the second lens unit G2 comprises, in order from the object side, a first negative lens component L21, a second positive lens component L22 and a third negative lens component L23.

Both the negative lens component L11 which is disposed in the first lens unit G1 and the first negative lens component L21 which is disposed on the object side in the second lens unit G2 are molded glass aspherical lens components which have aspherical surfaces $r_2$, $r_8$, and $r_9$.

Figure 9:
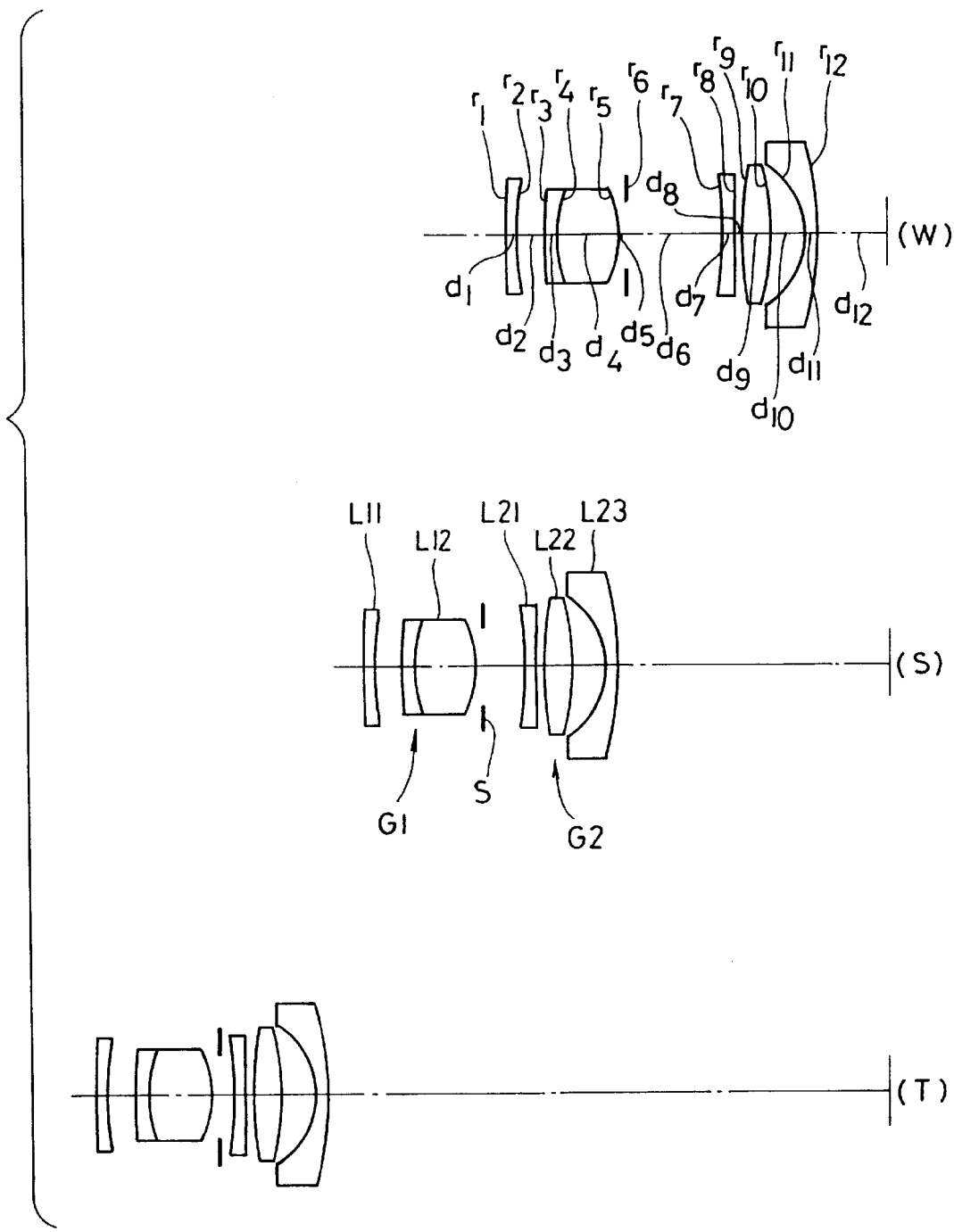

The ninth embodiment has a composition illustrated in FIG. 9, or comprises, in order from the object side, a first lens unit G1 having positive refractive power, an aperture stop S and a second lens unit G2 having negative refractive power, and is configured to change a magnification by moving the first lens unit G1 and the second lens unit G2 toward the object side while narrowing an airspace between the stop S and the second lens unit G2.

The first lens unit G1 comprises, in order from the object side, a first subunit which is composed of a negative lens component L11, and a second subunit which has positive refractive power and is composed of a cemented lens component L12 consisting of a negative lens element and a positive lens element. Furthermore, the second lens unit G2 comprises, in order from the object side, a first negative lens component L21, a second positive lens component L22 and a third negative lens component L23.

The negative lens component L11 which is disposed in the first lens unit G1, the first negative lens component L21 which is disposed on the object side in the second lens unit G2 and the third negative lens component L23 are molded glass aspherical lens components which have aspherical surfaces $r_2$, $r_8$ and $r_{11}$.

Figure 10:
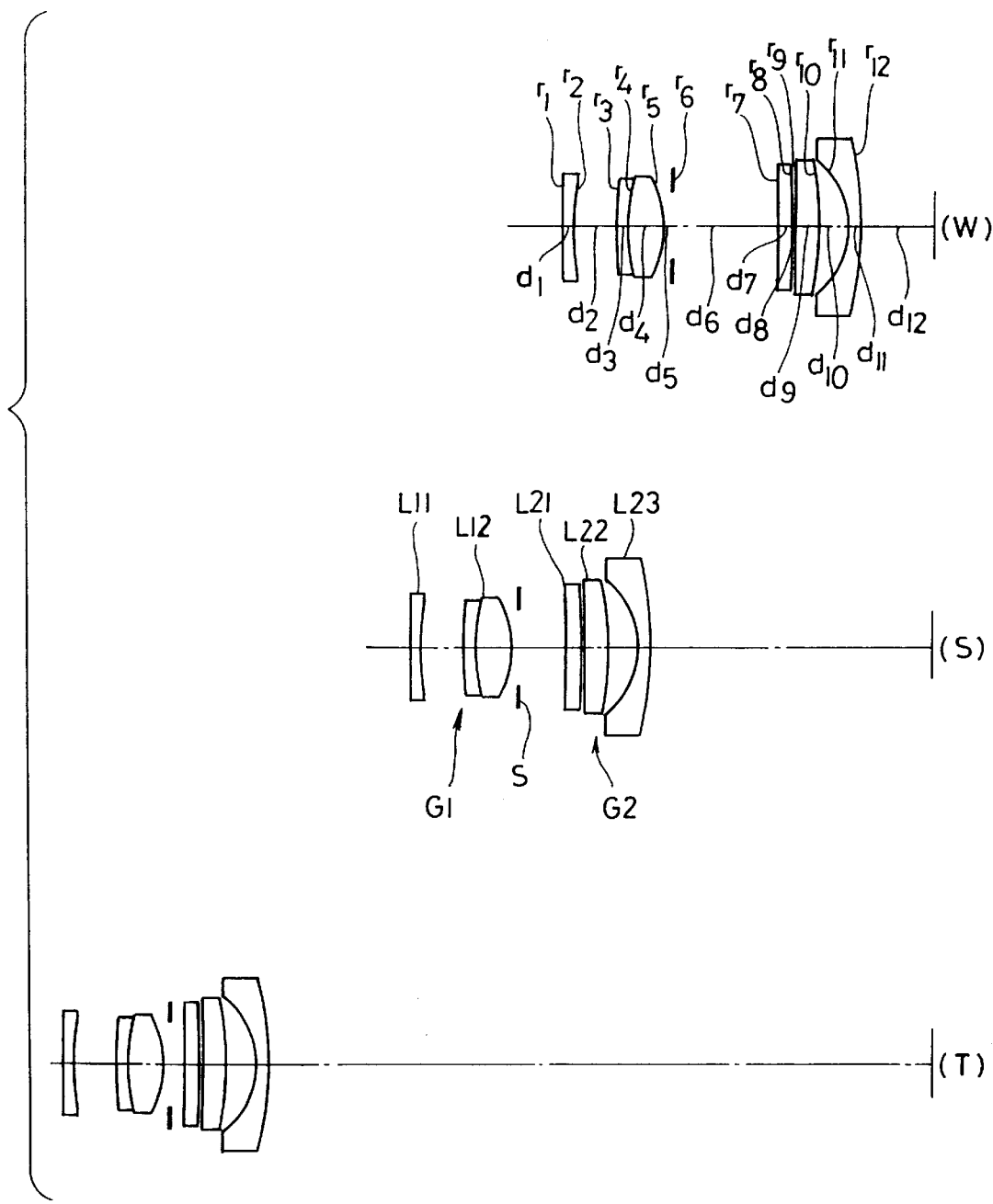
Figure 11:
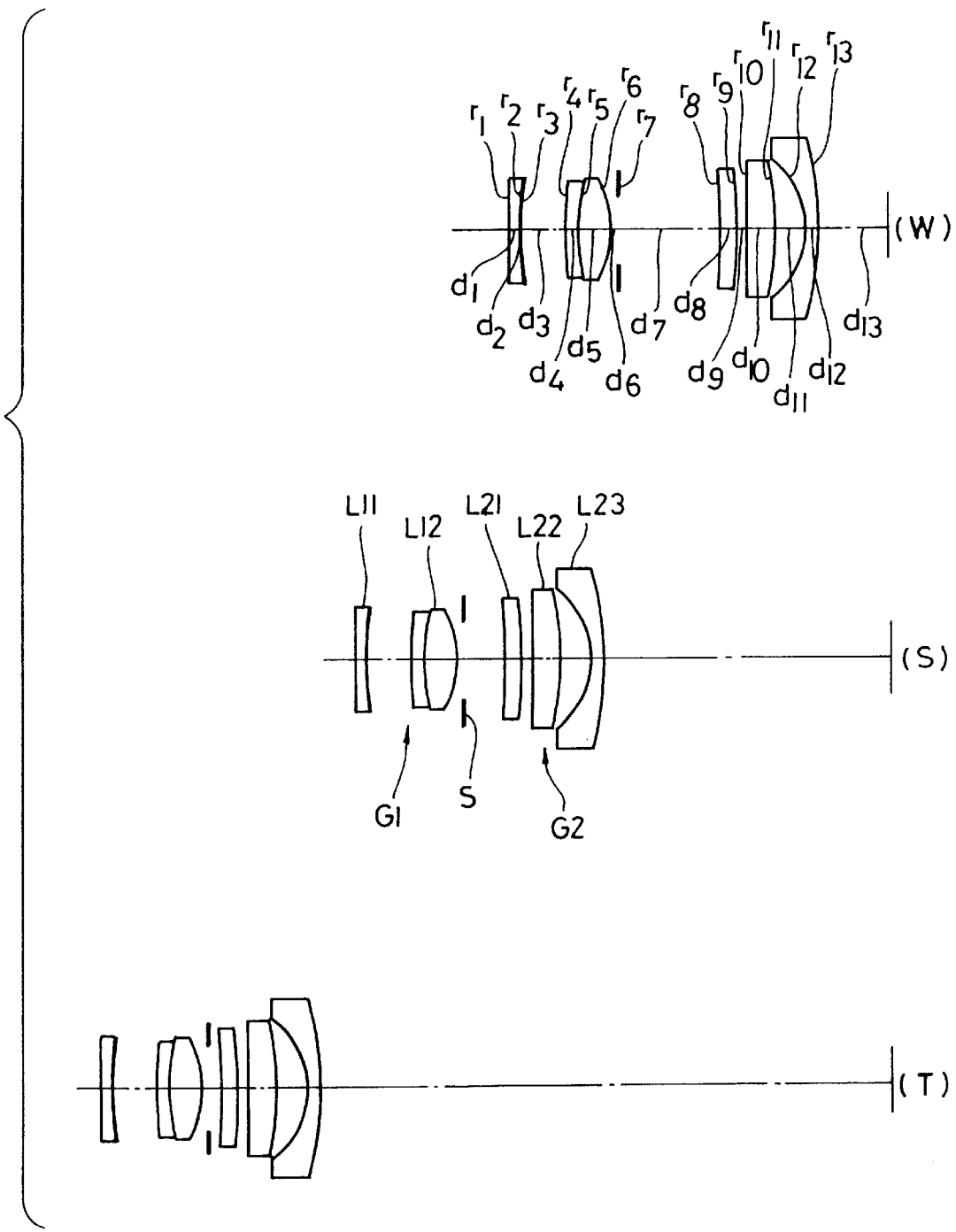

The tenth embodiment has a composition illustrated in FIG. 10, or comprises, in order from the object side, a first lens unit G1 having positive refractive power, an aperture stop S and a second lens unit G2 having negative refractive power, and changes a magnification from the wide position to the tele position by moving the first lens unit G1 and the second lens unit G2 toward the object side while narrowing an airspace between the stop and the second lens unit G2.

In this embodiment, the first lens unit G1 comprises, in order from the object side, a first subunit which is composed of a negative lens component L11, and a second subunit which is composed of a cemented lens component consisting of a negative lens element and a positive lens element and having positive refractive power, whereas the second lens unit G2 comprises, in order from the object side, a first negative lens component L21, a second positive lens component L22 and a third negative lens component L23.

The lens component L11 disposed in the first lens unit is a molded glass aspherical lens component which has an aspherical surface on an image side surface and the first negative lens component L21 disposed in the second lens unit is a molded resin aspherical lens component which has an aspherical object side surface $r_7$. This molded resin aspherical surface is made of a material having a low hygroscopicity and is varied little in a humid environment.

The eleventh embodiment comprises, in order from the object side, a first lens unit G1 having positive refractive power, an aperture stop S and a second lens unit G2, and is configured to change a magnification from the wide position to the tele position by moving the first lens unit G1 and the second lens unit G2 toward the object side while narrowing an airspace between the stop S and the second lens unit G2.

In this embodiment, the first lens unit G1 comprises, in order from the object side, a first subunit which is composed of a negative lens component L11, and a second subunit which is composed of a cemented lens component L12 consisting of a negative lens element and a positive lens element, whereas the second lens unit G2 comprises, in order from the object side, a first negative lens component L21, a second positive lens component L22 and a third negative lens component L23.

Furthermore, the lens component L11 disposed in the first lens unit G1 is a composite type aspherical lens component which has a resin layer having an aspherical surface $r_3$ disposed on an image side surface $r_2$ and the first negative lens component L21 disposed in the second lens unit G2 is a molded resin aspherical lens component which has an aspherical surface $r_9$. This aspherical lens component is made of a material having a low hygroscopicity and is varied little in a humid environment.

Figure 12:
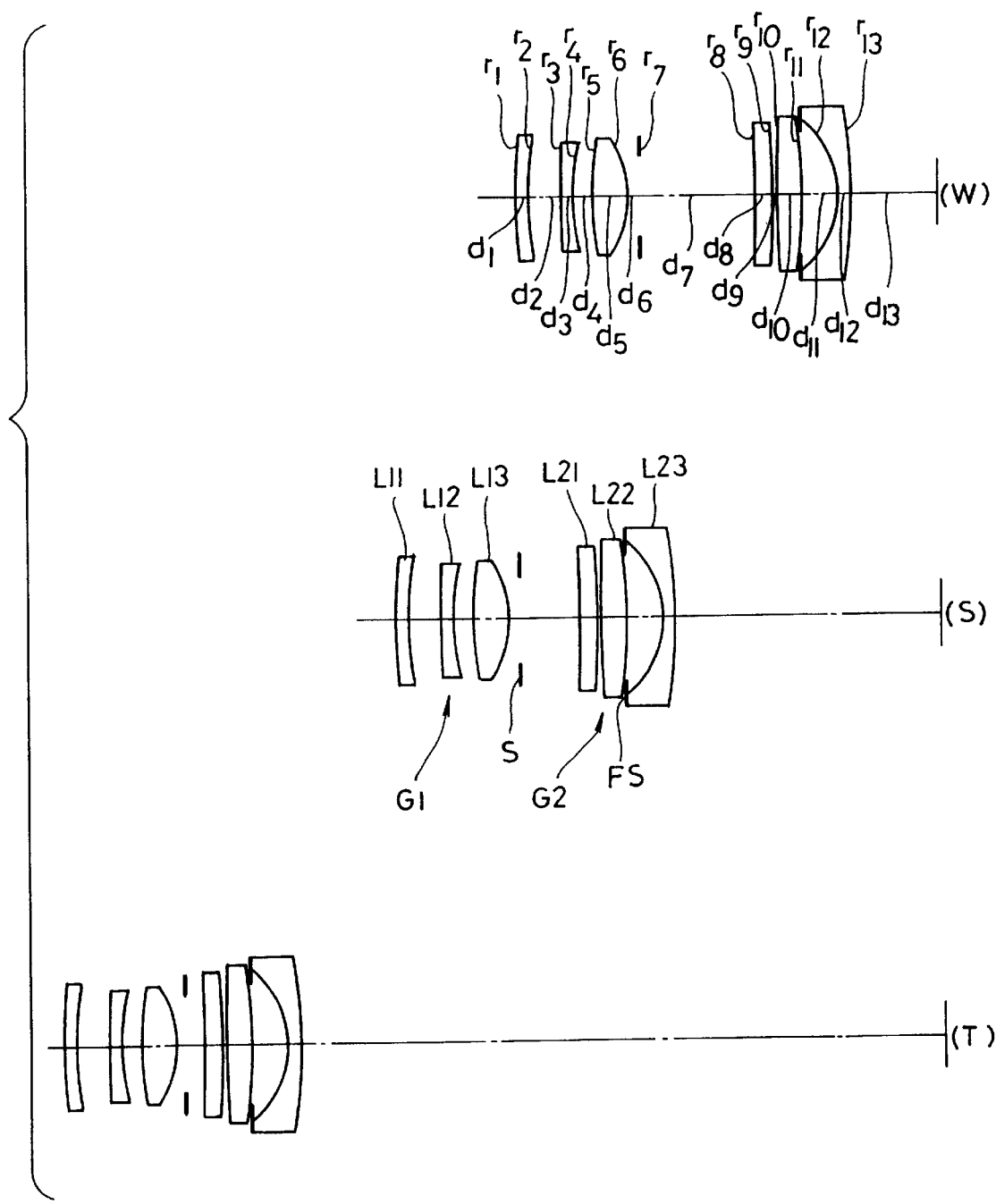

The twelfth embodiment is a zoom lens system which is composed as shown in FIG. 12, or comprises, in order from the object side, a first lens unit G1 having positive refractive power, an aperture stop and a second lens unit G2 having negative refractive power, and is configured to change a magnification from the wide position to the tele position by moving the first lens unit G1 and the second lens unit G2 toward the object side while narrowing an airspace between the stop S and the second lens unit G2.

Furthermore, the first lens unit G1 comprises, in order from the object side, a first subunit which is composed of a negative lens component L11, and a second subunit which is composed of a negative lens component L12 and a positive lens component L13, whereas the second lens unit G2 comprises, in order from the object side, of a first negative lens component L21, a second positive lens component L22 and a third negative lens component L23.

Furthermore, the negative lens component L11 disposed in the first lens unit G1 is a molded glass aspherical lens component which has an aspherical image side surface $r_2$ and the first negative lens component disposed in the second lens unit is a molded resin aspherical lens component which has an aspherical object side surface $r_8$. This molded resin aspherical lens component is made of material having a low hygroscopicity and is varied little in a humid environment.

Figure 14:
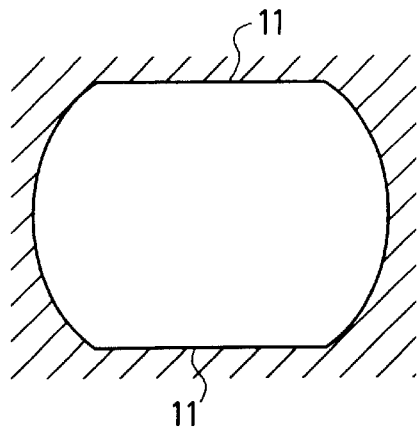
FIG. 14 is a diagram showing a shape of a flare stop used in the embodiments of the present invention.

In this embodiment, an oval stop having an aperture which is narrowed in a direction along a short side as shown in FIG. 14 is disposed between the second positive lens component L22 and the third negative lens component L23 of the second lens unit G2, and the third negative lens component L23 intercepts external rays which fall on D-cut portions 11 to prevent ghost flare from being produced. A location of this ghost flare stop is represented by a reference symbol FS in FIG. 12.

The zoom lens system preferred as the twelfth embodiment comprises the first positive lens unit, the stop and the second negative lens unit as described above, and is characterized in that the second negative lens unit comprises a D-cut lens component and a D stop which is disposed between the D-cut lens component and a lens component which is disposed adjacent to the D-cut lens component on the object side. The second lens unit is configured to match a D-cut direction with a narrow side of the aperture. In other words, the twelfth embodiment comprises the D stop between the second positive lens component and the third negative lens component disposed in the second lens unit, the second lens unit comprises the first negative lens component L21, the second positive lens component L22 and the third negative lens component L23, third negative lens component L23 out of these lens components is the D-cut lens component, and the D stop is disposed between the second positive lens component L22 and the third negative lens component L23.

When D-cut is made in a direction of the short side which has a large outside diameter to shorten an outside diameter of an optical system, a space can be effectively utilized. However, a marginal amount from a lens edge to a ray is reduced and reflection of rays on the edge constitutes a cause for ghost.

In case of a vari-focal lens system which is composed of two positive and negative lens units, a first lens unit is brought closest to a second lens unit at a tele position, whereby external rays are apt to fall on an edge of a D-cut lens component and ghost is apt to be produced. In order to prevent ghost from being produced, the D stop which has an aperture narrowed in a direction of the D-cut is disposed between the D-cut lens component and the lens component disposed adjacent thereto on the object side so that the external rays will not fall on the D-cut portions.

When an optical system is composed of a first positive lens unit, an aperture stop and a second negative lens unit, the aperture stop which is disposed after the first lens unit produces a tendency to shift an entrance pupil rearward and enlarge a diameter of a front lens component.

When the front lens component has a larger diameter, rays are apt to be incident at larger angles, whereby ghost is apt to be produced. Accordingly, it becomes necessary to dispose a stop at a location immediately before the D-cut portions. It is more effective to configure the D stop so as to have a size which is lower than a straight line traced from a rear edge of the D-cut portion to an edge of the front lens component which is located on an opposite side with regard to the optical axis.

Shapes of the aspherical surfaces used in the embodiments described above are expressed by the following formula:

$$x=(y^2/r)[1+\{1-(1+k)(y/r)^2\}^{1/2}]+A_4y^4+A_6y^6+A_8y^8+A_{10}y^{10}+A_{12}y^{12}+\ldots$$

wherein a direction along the optical axis is taken as an x axis, a direction perpendicular to the optical axis is taken as a y axis, a reference symbol r represents a radius of curvature on a reference sphere, and reference symbols k, $A_4$, $A_6$, ... designate aspherical surface coefficients.

In FIGS. 1 through 12 which illustrate the compositions of the first through twelfth embodiments, reference symbols (W), (S) and (T) represent a wide position, an intermediate focal length and a tele position respectively. Furthermore, FIG. 13 shows aberration curves of the first embodiment, wherein reference symbols (A), (B) and (C) designate aberrations for an infinite object distance at the wide position, intermediate focal length and tele position respectively.

Figure 13:
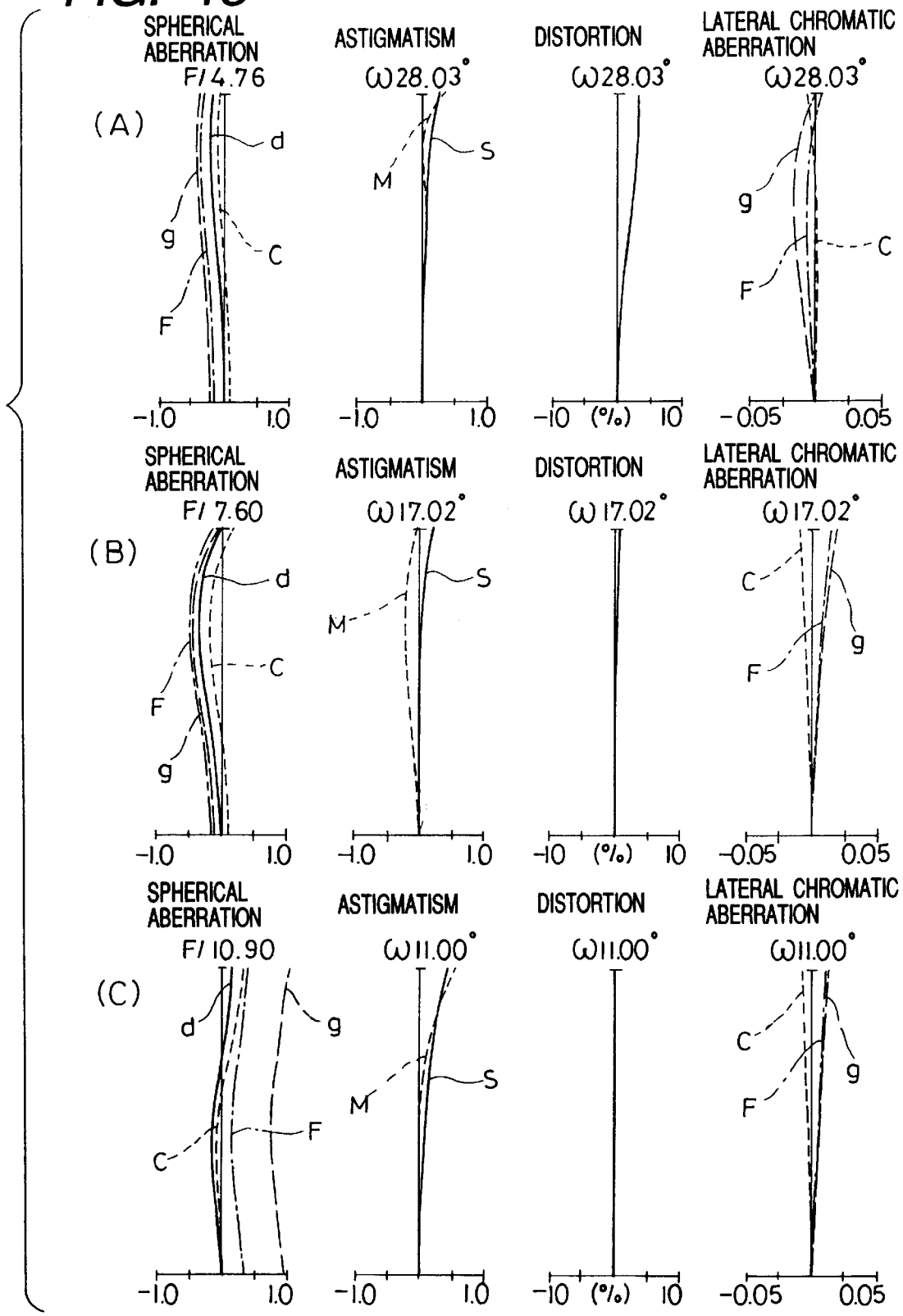
FIG. 13 shows curves illustrating aberration characteristics of the first embodiment.

As apparent from FIG. 13, aberrations are corrected favorably and varied little.

Figure 15:
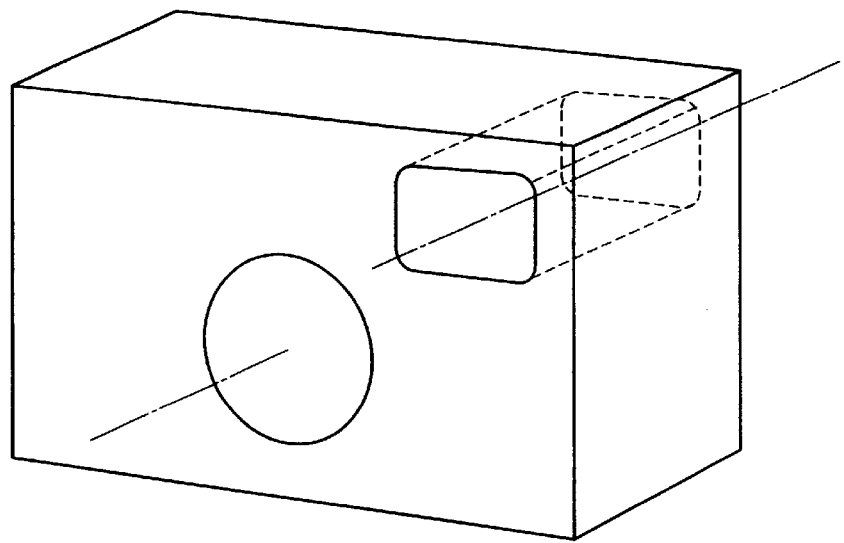
FIG. 15 is perspective view showing an appearance of a compact camera which uses the zoom lens system according to the present invention.
Figure 16:
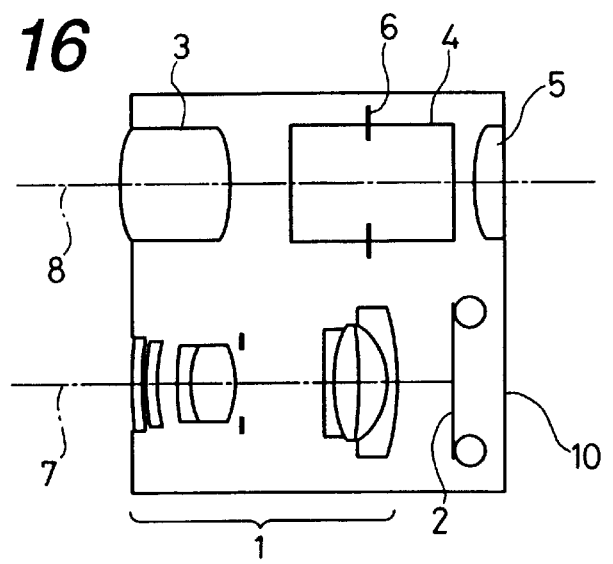
FIG. 16 is sectional view of the compact camera shown in FIG. 15.

FIGS. 15 and 16 are views showing the zoom lens system according to the present invention in a condition where the lens system is built as a photographic lens system in a 35 mm compact camera: FIG. 15 being a perspective view and FIG. 16 being a sectional view.

In these drawings, a reference numeral 1 represents the zoom lens system according to the present invention which is composed of the first lens unit $G_1$ and the second lens unit $G_2$, and set in a condition of the wide position of the first embodiment. A reference numeral 2 designates a film, a reference numeral 3 denotes a view finder objective lens, a reference numeral 4 represents an image erecting prism, a reference numeral 5 designates an eyepiece, a reference numeral 6 denotes a stop, and reference numerals 7 and 8 represent an optical path for photography and an optical for the view finder respectively. Furthermore, a reference numeral 10 designates a camera body.

This camera is configured so that the optical path for photography and the optical path for the view finder are arranged in parallel with each other, and an image of an object is observed through a view finder which is composed of the view finder objective lens 3, the image erecting prism 4, the stop 6 and the eyepiece 5, imaged and photographed on the film 2 by the zoom lens system 1 according to the present invention. An electronic image pickup device such as a CCD may be used in place of the film.

The present invention makes it possible to obtain a compact zoom lens system which has a simple composition consisting of two lens units, a short total length and a high vari-focal ratio, produces monochromatic aberrations and chromatic aberration in small amounts, and allows the aberrations to be varied little by changing a magnification.

What is claimed is:

1. A zoom lens system comprising, in order from the object side:

a first lens unit having positive refractive power; and a second lens unit having negative refractive power, wherein said zoom lens system is configured to change a magnification by varying an airspace between the first lens unit and the second lens unit, wherein the first lens unit consists of, in order from the object side, a first subunit having negative refractive power and a second subunit which consists of a lens component and has positive refractive power, wherein said second lens unit comprises a first negative lens component, a second positive lens component and a third negative lens component which are disposed in order from the object side with airspaces interposed, and wherein each lens component in the first subunit having negative refractive power which is disposed in the first lens unit satisfies the following condition (1-2):

$$-0.5<f_{G1}/f_{L1}<0.1 \tag{1-2}$$

wherein a reference symbol $f_{G1}$ represents a focal length of the first lens unit, a reference symbol $f_{L1}$ designates a focal length of each lens component disposed in the first subunit and a reference symbol i denotes an ordinal number of each lens component disposed in the first subunit.

2. A zoom lens system comprising in order from the object side: a first lens unit having positive refractive power; and a second lens having negative refractive power, wherein the zoom lens system changes a magnification at a ratio of 2 or higher by varying an airspace between said first lens unit having the positive refractive power and said second lens unit having the negative refractive power, and wherein said second lens unit having the negative refractive power comprises a negative lens component, a positive lens component and a negative lens component which are disposed with airspaces interposed and formed by molding a resin material, and satisfies the following condition (3):

$$-0.03(1/\text{mm})<MGL/|f_{21}<0.03(1/\text{mm}) \tag{3}$$

wherein a reference symbol MGL represents a maximum value of a lateral magnification of an optical system which is disposed on the image side of the negative lens component disposed on the most object side in said second lens unit having the negative refractive power, and a reference symbol $f_{21}$ designates a focal length of the negative lens component disposed on the most object side in the second lens unit having the negative refractive power.

3. A zoom lens system comprising in order from the object side: a first lens unit having positive refractive power; and a second lens unit having negative refractive power, wherein the zoom lens system is configured to change a magnification by varying an airspace between said first lens unit having the positive refractive power and said second lens unit having the negative refractive power, and moving said second lens unit on object side from tele position to wide position, wherein said second lens unit having the negative refractive power comprises a negative lens component, a positive lens component and a negative lens component which are disposed in order from the object side with airspaces interposed, and wherein said positive lens component has an Abbe's number of 40 or larger.

4. A zoom lens system comprising in order from the object side: a first lens unit having positive refractive power; and a second lens unit having negative refractive power, wherein the zoom lens system is configured to change a magnification by varying an airspace between said first lens unit and said second lens unit, wherein said second lens unit comprises a first negative lens component, a second positive lens component and a third negative lens component which are disposed in order from the object side with airspaces interposed, wherein the zoom lens system has a vari-focal ratio of 2 or higher, comprises at least an asperical surface in said first lens component, and wherein said second lens unit satisfies the following condition (2-1):

$$D/|f_{G2}|>0.04 \tag{2-1}$$

wherein a reference symbol $f_{G2}$ represents a total focal length of the second lens unit, and a reference symbol D designates a distance between the first negative lens component and the second positive lens component disposed in the second lens unit.

5. A zoom lens system comprising in order from the object side: a first lens unit having positive refractive power; and a second lens unit having negative refractive power, wherein the zoom lens system is configured to change a magnification by varying an airspace between said first lens unit and said second lens unit, wherein said second lens unit comprises, in order from the object side, a first negative lens component, a second positive lens component and a third negative lens component, wherein an aperture stop is disposed between said first lens unit and said second lens unit, and wherein a flare stop is disposed on the object side of said third negative lens component to prevent flare.

6. The zoom lens system according to claim 1,
wherein said first subunit of said first lens unit consists of two negative lens components,
wherein said second subunit consists of a cemented lens component consisting of a negative lens element and a positive lens element, and
wherein said first negative lens component is a molded glass aspherical lens component.

7. The zoom lens system according to claim 1,
wherein said first subunit of the first lens unit consists of a negative lens component consisting of a lens element,
wherein said second subunit consists of a cemented lens component consisting of a negative lens element and a positive lens element, and
wherein said negative lens component of the first subunit is a molded glass aspherical lens component.

8. The zoom lens system according to claim 1,
wherein said first lens unit comprises a positive lens element disposed on the most image side of the first lens unit and satisfies the following condition (4):

$$5<\nu_{1P}-\nu_{2P}<25 \tag{4}$$

wherein a reference symbol $\nu_{1P}$ represents an Abbe's number of the positive lens component disposed on the most image side in the first lens unit and a reference symbol $\nu_{2P}$ designates an Abbe's number of the positive lens component disposed in the second lens unit.

9. The zoom lens system according to claim 1, 2, 3 or 4, wherein said first negative lens component is a composite type aspherical lens component which has an aspherical resin layer formed on an image side surface of the lens component.

10. The zoom lens system according to claim 1, 2, 3 or 4, wherein said first negative lens component is an aspherical glass lens component which has an aspherical image side surface.

11. The zoom lens system according to claim 1, 2, 3 or 5, wherein at least an aspherical surface is disposed in said second lens unit.

12. The zoom lens system according to claim 11, wherein said aspherical surface is disposed in the first lens component or the second lens component in said second lens unit.

13. The zoom lens system according to claim 12 satisfying the following condition (2):

$$D/|f_{G2}|>0.03 \tag{2}$$

wherein a reference symbol $f_{G2}$ represents a total focal length of the second lens unit, and a reference symbol D designates a distance between the first negative lens component and the second positive lens component disposed in the second lens unit.

14. The zoom lens system according to claim 1, 2, 3, 4 or 5, wherein the first negative lens component has power which is weaker than that of the second positive lens component in said second lens unit.

15. The zoom lens system according to claim 1, 3, 4 or 5 satisfying the following condition (3):

$$-0.03(1/mm)<MGL/|f_{21}|<0.03(1/mm) \tag{3}$$

wherein a reference symbol MGL represents a maximum value of a lateral magnification of an optical system which is disposed on the image side of the negative lens component disposed on the most object side in the second lens unit a focal length of the negative lens component which is disposed on the most object side in the second lens unit having the negative refractive power.

16. The zoom lens system according to claim 1 or 3 having a vari-focal ratio of 2 or higher.

17. The zoom lens system according to claim 1, 2, 4 or 5, wherein the second lens component disposed in the second lens unit has an Abbe's number of 40 or larger.

18. A camera comprising the zoom lens system according to claim 1, 2, 3, 4 or 5 as a photographic lens system and an optical system for view finder.

19. A zoom lens system comprising in order from the object side:
a first lens unit having positive refractive power; and
a second lens unit having negative refractive power,
wherein said zoom lens system is configured to change a magnification by varying an airspace between the first lens unit and second lens unit,
wherein the first lens unit consists of, in order from the object side, a first subunit having negative refractive power and a second subunit which consists of a biconvex cemented lens component and has positive refractive power,
wherein said second lens unit comprises a first negative lens component, a second positive lens component and a third negative lens component which are disposed in order from the object side with airspaces interposed, and
wherein all lens components in the first subunit having negative refractive power which are disposed in the first lens unit satisfy the following condition (1):

$$-1<f_{G1}/f_{Li}<0.3 \tag{1}$$

wherein a reference symbol $f_{G1}$ represents a focal length of the first lens unit, a reference symbol $f_{Li}$ designates a focal length of each lens component disposed in the first subunit and a reference symbol i denotes an ordinal number of each lens component disposed in the first subunit.

20. A zoom lens system comprising in order from the object side:
   a first lens unit having positive refractive power; and
   a second lens unit having negative refractive power,
   wherein said zoom lens system is configured to change a magnification by varying an airspace between the first lens unit and second lens unit,
   wherein the first lens unit consists of, in order from the object side, a first subunit having negative refractive power and a second subunit which consists of a positive lens component, said positive lens component is the only lens component having positive refractive power in said first lens unit,
   wherein said second lens unit comprises a first negative lens component, a second positive lens component and a third negative lens component which are disposed in order from the object side with airspace interposed, and
   wherein all lens components in the first subunit having negative refractive power which are disposed in the first lens unit satisfy the following condition (1):

$$-1 < f_{G1}/f_{Li} < 0.3 \qquad (1)$$

wherein a reference symbol $f_{G1}$ represents a focal length of the first lens unit, a reference symbol $f_{Li}$ designages a focal length of each lens component disposed in the first subunit and a reference symbol i denotes an ordinal number of each lens component disposed in the first subunit.

21. A zoom lens system comprising in order from the object side:
   a first lens unit having positive refractive power; and a second lens unit having negative refractive power, wherein the zoom lens system is configured to change a magnification by varying an airspace between said first lens unit having the positive refractive power and said second lens unit having the negative refractive power, said airspace between said first lens unit and said second lens unit is narrower at the tele position than that at the wide position,
   wherein said second lens unit having the negative refractive power comprises a negative lens component, a positive lens component and a negative lens component which are disposed in order from the object side with airspaces interposed, and
   wherein said positive lens component has an Abbe's number of 40 or larger.

22. A zoom lens system comprising in order from the object side: a first lens unit having positive refractive power; a second lens unit having negative refractive power; and an aperture stop on the object side of said second lens unit, wherein the zoom lens system is configured to change a magnification by varying an airspace between said first lens unit having the positive refractive power and said second lens unit having the negative refractive power,
   wherein said second lens unit having the negative refractive power comprises a negative lens component, a positive lens component and a negative lens component which are disposed in order from the object side with airspaces interposed, and wherein said positive lens component has an Abbe's number of 40 or larger.

23. A zoom lens system comprising in order form the object side: a first lens unit having positive refractive power; and a second lens unit having negative refractive power, wherein the zoom lens system changes a magnification at a ratio of 2 or higher by varying an airspace between said first lens unit having positive refractive power and said second lens unit having negative refractive power,
   wherein said first lens unit comprises a cemented lens component disposed on the most image side in said first lens unit, and wherein said second lens unit having the negative refractive power comprises a negative lens component, a positive lens component and a negative lens component which are disposed with airspaces interposed and formed by molding a resin material, and satisfies the following condition (3):

$$-0.03(1/\mathrm{mm}) < MGL/|f_{21}| < 0.03(1/\mathrm{mm}) \qquad (3)$$

wherein a reference symbol MGL represents a maximum value of a lateral magnification of an optical system which is disposed on the image side of the negative lens component disposed on the most object side in said second lens unit having the negative refractive power, and a reference symbol $f_{21}$ designates a focal length of the negative lens component disposed on the most object side in the second lens unit having the negative refractive power.

24. A zoom lens system comprising in order from the object side:
   a first lens unit having positive refractive power; and
   a second lens unit having negative refractive power,
   wherein the zoom lens system is configured to change a magnification by varying an airspace between said first lens unit and said second lens unit,
   wherein said first lens unit comprises a cemented lens component disposed on the most image side in said first lens unit,
   wherein said second lens unit comprises a first negative lens component, a second positive lens component and a third negative lens component which are disposed in order from the object side with airspaces interposed,
   wherein the zoom lens system has vari-focal ratio of 2 or higher, comprises at least an aspherical surface in said first lens component, and wherein said second lens unit satisfies the following condition (2):

$$D/|f_{G2}| > 0.03 \qquad (2)$$

wherein a reference symbol $f_{G2}$ represents a total focal length of the second lens unit, and a reference symbol D designates a distance between the first negative lens component and the second positive lens component disposed in the second lens unit.

25. A zoom lens system comprising in order from the object side:
   a first lens unit having positive refractive power; and a second lens unit having negative refractive power, wherein the zoom lens system changes a magnification at a ratio of 2 or higher by varying an airspace between said first lens unit having positive refractive power and said second lens unit having negative refractive power,
   wherein said first lens unit consist of three or fewer lens components and wherein said second lens unit having the negative refractive power comprises a negative lens component, a positive lens component and a negative lens component which are disposed with airspaces interposed and formed by molding resin material, and satisfies the following condition (3):

$$-0.03(1/\mathrm{mm}) < MGL/|f_{21}| < 0.03(1/\mathrm{mm}) \qquad (3)$$

wherein a reference symbol MGL represents a maximum value of a lateral magnification of an optical system which is disposed on the image side of the negative lens component disposed on the most object side in said second lens unit having the negative refractive power, and a reference symbol $f_{21}$ designates a focal length of the negative lens component disposed on the most object side in the second lens unit having the negative refractive power.

26. A zoom lens system comprising in order from the object side:

a first lens unit having positive refractive power; and a second lens unit having negative refractive power, wherein the zoom lens system is configured to change a magnification by varying an airspace between said first lens unit and said second lens unit, wherein said first lens unit consist of three or fewer lens component wherein said second lens unit comprises a first negative lens component, a second positive lens component and a third negative lens component which are disposed in order from the object side with airspaces interposed, wherein the zoom lens system has vari-focal ratio of 2 or higher, comprises at least an aspherial surface in said first lens component, and wherein said second lens unit satisfies the following condition (2):

$$D/|f_{G2}|>0.03 \qquad (2)$$

wherein a reference symbol $f_{G2}$ represents a total focal length of the second lens unit, and a reference symbol D designates a distance between the first negative lens component and the second positive lens component disposed in the second lens unit.

27. A zoom lens system comprising in order from the object side:

a first lens unit having positive refractive power; and
a second lens unit having negative refractive power, wherein the zoom lens system changes a magnification at a ratio of 2 or higher by varying an airspace between said first lens unit having positive refractive power and said second lens unit having negative refractive power, wherein said first lens unit comprises a positive lens component and said positive lens component is the only positive lens component in said first lens unit, and wherein said second lens unit having the negative refractive power comprises a negative lens component, a positive lens component and a negative lens component which are disposed with airspaces interposed and formed by molding a resin material, and satisfies the following condition (3):

$$-0.03(1/mm)<MGL/|f_{21}|<0.03(1/mm) \qquad (3)$$

wherein a reference symbol MGL represents a maximum value of a lateral magnification of an optical system which is disposed on the image side of the negative lens component disposed on the most object'side in said second lens unit having the negative refractive power, and a reference symbol $f_{21}$ designates a focal length of the negative lens component disposed on the most object side in the second lens unit having the negative refractive power.

28. A zoom lens system comprising in order from the object side:

a first lens unit having positive refractive power; and
a second lens unit having negative refractive power, wherein the zoom lens system is configured to change a magnification by varying an airspace between said first lens unit and said second lens unit, wherein said first lens unit comprises a positive lens component and said positive lens component is the only positive lens component in said first lens unit, wherein said second lens unit comprises a first negative lens component, a second positive lens component and a third negative lens component which are disposed in order from the object side with airspaces interposed, wherein the zoom lens system has vari-focal ratio of 2 or higher, comprises at least an aspherical surface in said first lens component, and wherein said second lens unit satisfies the following condition (2):

$$D/|f_{G2}|>0.03 \qquad (2)$$

wherein a reference symbol $f_{G2}$ represents a total focal length of the second lens unit, and a reference symbol D designates a distance between the first negative lens component and the second positive lens component disposed in the second lens unit.

* * * * *